United States Patent
Yeh

(10) Patent No.: US 8,250,292 B2
(45) Date of Patent: Aug. 21, 2012

(54) DATA WRITING METHOD FOR A FLASH MEMORY, AND CONTROLLER AND STORAGE SYSTEM USING THE SAME

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 443 days.

(21) Appl. No.: 12/633,175

(22) Filed: Dec. 8, 2009

(65) Prior Publication Data

US 2011/0087827 A1   Apr. 14, 2011

(30) Foreign Application Priority Data

Oct. 14, 2009   (TW) .............................. 98134801 A

(51) Int. Cl.
  *G06F 12/12* (2006.01)
(52) U.S. Cl. ........................................ 711/103; 711/155
(58) Field of Classification Search ........................ None
  See application file for complete search history.

(56) References Cited

U.S. PATENT DOCUMENTS

| 2010/0017555 A1* | 1/2010 | Chang et al. | 711/103 |
| 2010/0161880 A1* | 6/2010 | You | 711/103 |
| 2010/0268865 A1* | 10/2010 | Ramiya Mothilal | 711/103 |

* cited by examiner

*Primary Examiner* — Than Nguyen
(74) *Attorney, Agent, or Firm* — J.C. Patents

(57) ABSTRACT

A data writing method for writing data from a host system into a flash memory chip is provided. The method includes configuring a plurality of logical page addresses, grouping the logical page addresses into a plurality of logical blocks, and recording the data dispersion degree of each of the logical blocks. The method also includes receiving write-in data from the host system, identifying a logical block that a logical page address to be written by the host system belongs to, and writing the write-in data into the flash memory chip according to the data dispersion degree of the logical block, wherein the data dispersion degree of each of the logical blocks is not larger than a logical block data dispersion degree threshold value. Accordingly, the method can effectively reduce the time for executing a host write command.

26 Claims, 20 Drawing Sheets

410

| Logical page index | Physical page address |
|---|---|
| LBA-(0) | PBA-(0) |
| LBA-(1) | PBA-(1) |
| LBA-(2) | PBA-(2) |
| ⋮ | ⋮ |
| LBA-(127) | PBA-(127) |
| LBA-(128) | PBA-(128) |
| LBA-(129) | PBA-(129) |
| ⋮ | ⋮ |
| LBA-(L) | PBA-(L) |

| Physical page index | Logical page address |
|---|---|
| PBA-(0) | LBA-(0) |
| PBA-(1) | LBA-(1) |
| PBA-(2) | LBA-(2) |
| ⋮ | ⋮ |
| PBA-(127) | LBA-(127) |
| PBA-(128) | LBA-(128) |
| PBA-(129) | LBA-(129) |
| ⋮ | ⋮ |
| PBA-(L) | LBA-(L) |
| PBA-(L+1) | NULL |
| PBA-(L+2) | NULL |
| PBA-(L+3) | NULL |
| ⋮ | ⋮ |
| PBA-(K) | NULL |

| Logical page index | Physical page address |
|---|---|
| LBA-(0) | PBA-(0) |
| LBA-(1) | PBA-(L+1) |
| LBA-(2) | PBA-(2) |
| ⋮ | ⋮ |
| LBA-(127) | PBA-(127) |
| LBA-(128) | PBA-(128) |
| LBA-(129) | PBA-(129) |
| ⋮ | ⋮ |
| LBA-(L) | PBA-(L) |

| Physical page index | Logical page address |
|---|---|
| PBA-(0) | LBA-(0) |
| PBA-(1) | LBA-(1) |
| PBA-(2) | LBA-(2) |
| ⋮ | ⋮ |
| PBA-(127) | LBA-(127) |
| PBA-(128) | LBA-(128) |
| PBA-(129) | LBA-(129) |
| ⋮ | ⋮ |
| PBA-(L) | LBA-(L) |
| PBA-(L+1) | LBA-(1) |
| PBA-(L+2) | NULL |
| PBA-(L+3) | NULL |
| ⋮ | ⋮ |
| PBA-(K) | NULL |

FIG. 5B

| Logical page index | Physical page address |
|---|---|
| LBA-(0) | PBA-(0) |
| LBA-(1) | PBA-(L+1) |
| LBA-(2) | PBA-(2) |
| ⋮ | ⋮ |
| LBA-(127) | PBA-(127) |
| LBA-(128) | PBA-(128) |
| LBA-(129) | PBA-(129) |
| ⋮ | ⋮ |
| LBA-(L) | PBA-(L) |

| Physical page index | Logical page address |
|---|---|
| PBA-(0) | LBA-(0) |
| PBA-(1) | LBA-(1) |
| PBA-(2) | LBA-(2) |
| ⋮ | ⋮ |
| PBA-(127) | LBA-(127) |
| PBA-(128) | LBA-(128) |
| PBA-(129) | LBA-(129) |
| ⋮ | ⋮ |
| PBA-(L) | LBA-(L) |
| PBA-(L+1) | LBA-(1) |
| PBA-(L+2) | LBA-(129) |
| PBA-(L+3) | NULL |
| ⋮ | ⋮ |
| PBA-(K) | NULL |

| 122-(S+1) | 122-(S+2) | 122-(D) |
|---|---|---|
| Data of the logical block 350-(0) | Data of the logical block 350-(1) | Data of the logical block 350-(2) |
| Data of the logical block 350-(0) | Data of the logical block 350-(1) | Data of the logical block 350-(2) |
| Data of the logical block 350-(3) | Data of the logical block 350-(1) | |
| Data of the logical block 350-(3) | Data of the logical block 350-(1) | |

FIG. 7A

| 122-(S+1) | 122-(S+2) | 122-(D) |
|---|---|---|
| Data of the logical block 350-(0) | Data of the logical block 350-(1) | Data of the logical block 350-(2) |
| Data of the logical block 350-(0) | Data of the logical block 350-(1) | Data of the logical block 350-(2) |
| Data of the logical block 350-(3) | Data of the logical block 350-(1) | Data of the logical block 350-(3) |
| Data of the logical block 350-(3) | Data of the logical block 350-(1) | |

FIG. 7B

| 122-(S+1) | 122-(S+2) | 122-(D) |
|---|---|---|
| Data of the logical block 350-(0) | Data of the logical block 350-(1) | Data of the logical block 350-(2) |
| Data of the logical block 350-(0) | Data of the logical block 350-(1) | Data of the logical block 350-(2) |
| Data of the logical block 350-(3) | Data of the logical block 350-(1) | Data of the logical block 350-(3) |
| Data of the logical block 350-(3) | Data of the logical block 350-(1) | Data of the logical block 350-(3) |

FIG. 7C

| 122-(S+1) | 122-(S+2) | 122-(D) |
|---|---|---|
| Data of the logical block 350-(0) | Data of the logical block 350-(1) | Data of the logical block 350-(2) |
| Data of the logical block 350-(0) | Data of the logical block 350-(1) | Data of the logical block 350-(2) |
| Data of the logical block 350-(3) | Data of the logical block 350-(1) | |
| Data of the logical block 350-(3) | Data of the logical block 350-(3) | |

FIG. 8A

| 122-(S+1) | 122-(S+2) | 122-(D) |
|---|---|---|
| Data of the logical block 350-(0) | Data of the logical block 350-(1) | Data of the logical block 350-(2) |
| Data of the logical block 350-(0) | Data of the logical block 350-(1) | Data of the logical block 350-(2) |
| Data of the logical block 350-(3) | Data of the logical block 350-(1) | Data of the logical block 350-(3) |
| Data of the logical block 350-(3) | Data of the logical block 350-(3) | Data of the logical block 350-(3) |

FIG. 8B

| 122-(S+1) | 122-(S+2) | 122-(D) |
|---|---|---|
| Data of the logical block 350-(0) | Data of the logical block 350-(1) | Data of the logical block 350-(2) |
| Data of the logical block 350-(0) | Data of the logical block 350-(1) | Data of the logical block 350-(3) |
| Data of the logical block 350-(0) | Data of the logical block 350-(1) | |
| Data of the logical block 350-(3) | Data of the logical block 350-(2) | |

FIG. 12A

| 122-(S+1) | 122-(S+2) | 122-(D) |
|---|---|---|
| Data of the logical block 350-(0) | Data of the logical block 350-(1) | Data of the logical block 350-(2) |
| Data of the logical block 350-(0) | Data of the logical block 350-(1) | Data of the logical block 350-(3) |
| Data of the logical block 350-(0) | Data of the logical block 350-(1) | Data of the logical block 350-(3) |
| Data of the logical block 350-(3) | Data of the logical block 350-(2) | |

DATA WRITING METHOD FOR A FLASH MEMORY, AND CONTROLLER AND STORAGE SYSTEM USING THE SAME

CROSS-REFERENCE TO RELATED APPLICATION

This application claims the priority benefit of Taiwan application serial no. 98134801, filed on Oct. 14, 2009. The entirety of the above-mentioned patent application is hereby incorporated by reference herein and made a part of specification.

BACKGROUND

1. Technology Field

The present invention relates to a data writing method for a flash memory and particularly to a data writing method capable of effectively writing data into a flash memory, and a flash memory controller and a flash memory storage system using the method.

2. Description of Related Art

Flash memory is the most adaptable memories to be applied in portable electronic products which are supplied power by batteries due to its data non-volatility, low power consumption, small volume, and non-mechanical structure. For example, a solid state drive (SSD) is a storage device that uses a NAND flash memory as its storage medium, and which has been broadly used in notebook computers as the main storage device.

In general, the flash memory chip of a flash memory storage device has a plurality of physical blocks, each physical block has a plurality of physical pages, and each physical block is the erasing unit and each physical page is the programming unit. Because a flash memory chip can only be programmed (i.e., written) in a single direction (i.e., the value of a memory cell thereof can only be programmed from 1 to 0), data cannot be directly written into a physical page that has been programmed before (i.e., a physical page contains data). Instead, the page has to be erased first before it can be programmed. In particular, since a flash memory chip is erased in unit of physical blocks, when a physical page containing old data is to be erased, the entire physical block corresponding to the physical page has to be erased. Accordingly, the physical blocks of the flash memory chip are grouped into a data area and a spare area. The physical blocks in the data area are physical blocks which have stored data, and the physical blocks in the spare area are physical blocks which do not have stored data. When a host system is about to store data in the flash memory storage device, a control circuit of the flash memory storage device gets a physical block from the spare area to write-in data, and the gotten physical block is linked to the data area. And, when the physical block in the data area is erased, the erased physical block is linked to the spare area.

Additionally, the host system writes data based on logical addresses, but usually not according to the order of the logical addresses. Accordingly, when the control circuit of the flash memory storage device is about to erase a physical block, the flash memory storage will spend a lot of time to process valid data and invalid data in the entire physical block. Therefore, how to increase the speed of writing data in a flash memory is one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a data writing method capable of effectively reducing the time for writing data into a flash memory.

The present invention is directed to a flash memory controller capable of effectively reducing the time for writing data into a flash memory.

The present invention is directed to a flash memory storage system capable of effectively reducing the time for writing data into a flash memory.

According to an exemplary embodiment of the present invention, a data writing method for writing data from a host system into a flash memory chip is provided, wherein the flash memory chip includes a plurality of physical blocks and each of the physical blocks has a plurality of physical page addresses. The data writing method includes: configuring a plurality of logical page addresses; grouping the logical page addresses into a plurality of logical blocks; and recording a data dispersion degree of each of logical blocks, wherein the data dispersion degree of the logical block is the number of physical blocks stored data belonging to the corresponding logical block. The data writing method also includes receiving write-in data from the host system, wherein the write-in data is written into a first logical page address among the logical page addresses, and the first logical page address belongs to a first logical block among the logical blocks. The data writing method still includes obtaining a first physical page address among the physical page addresses. The data writing method further includes writing the write-in data into the flash memory chip according to the data dispersion degree of the first logical block and the first physical page address, wherein the data dispersion degree of each of the logical blocks is not larger than a logical block data dispersion degree threshold value.

According to an exemplary embodiment of the present invention, a flash memory controller for writing data from a host system into a flash memory chip is provided, wherein the flash memory chip includes a plurality of physical blocks and each of the physical blocks has a plurality of physical page addresses. The flash memory controller includes a microprocessor unit, a flash memory interface unit, a host interface unit, and a memory management unit. The flash memory interface unit is coupled to the microprocessor unit and configured to couple to the flash memory chip. The host interface unit is coupled to the microprocessor unit and configured to couple to a host system. The memory management unit is coupled to the microprocessor unit and configured to configure a plurality of logical page addresses, group the logical page addresses into a plurality of logical blocks and record a data dispersion degree of each of logical blocks, wherein the data dispersion degree of the logical block is the number of physical blocks stored data belonging to the corresponding logical block. Additionally, the host interface unit receives write-in data from a host system, wherein the write-in data is written into a first logical page address among the logical page addresses, and the first logical page address belongs to a first logical block among the logical blocks. And, the memory management unit obtains a first physical page address among the physical page addresses. Furthermore, the memory management unit writes the write-in data into the flash memory chip according to the data dispersion degree of the first logical block and the first physical page address, wherein the data dispersion degree of each of the logical blocks is not larger than a logical block data dispersion degree threshold value.

According to an exemplary embodiment of the present invention, a flash memory storage system including a connector, a flash memory chip, and a flash memory controller is provided. The flash memory chip includes a plurality of physical blocks and each of the physical blocks has a plurality of physical page addresses. The connector is configured to couple to a host system. The flash memory controller is coupled to the flash memory chip and the connector and configured to configure a plurality of logical page addresses, group the logical page addresses into a plurality of logical blocks and record the data dispersion degree of each of logical blocks, wherein the data dispersion degree of the logical block is the number of physical blocks stored data belonging to the corresponding logical block. Additionally, the flash memory controller receives write-in data from the host system, wherein the write-in data is written into a first logical page address among the logical page addresses, and the first logical page address belongs to a first logical block among the logical blocks. And, the flash memory controller obtains a first physical page address among the physical page addresses. Furthermore, the flash memory controller writes the write-in data into the flash memory chip according to the data dispersion degree of the first logical block and the first physical page address, wherein the data dispersion degree of each of the logical blocks is not larger than a logical block data dispersion degree threshold value.

As described above, the data writing method provided by the exemplary embodiment of the present invention is capable of preventing that the stored data is too dispersive, thereby effectively reducing the time for executing a host write command.

In order to make the aforementioned and other features and advantages of the invention more comprehensible, embodiments accompanying figures are described in detail below.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4A and FIG. 4B are diagrams illustrating a logical page-physical page mapping table and a physical page-logical page mapping table according to an example of the first exemplary embodiment of the present invention.

FIG. 5A and FIG. 5B are diagrams illustrating a logical page-physical page mapping table and a physical page-logical page mapping table according to another example of the first exemplary embodiment of the present invention.

FIG. 6A and FIG. 6B are diagrams illustrating a logical page-physical page mapping table and a physical page-logical page mapping table according to another example of the first exemplary embodiment of the present invention.

FIGS. 7A, 7B and 7C are diagrams illustrating an example of writing data according to the first embodiment of the present invention.

FIGS. 8A and 8B are diagrams illustrating another example of writing data according to the first embodiment of the present invention.

FIGS. 12A and 12B are diagrams illustrating an example of writing data according to a second embodiment of the present invention.

FIGS. 13A and 13B are diagrams illustrating another example of writing data according to the second embodiment of the present invention.

FIGS. 14A and 14B are diagrams illustrating another example of writing data according to the second embodiment of the present invention.

DESCRIPTION OF EMBODIMENTS

Figure 1A:
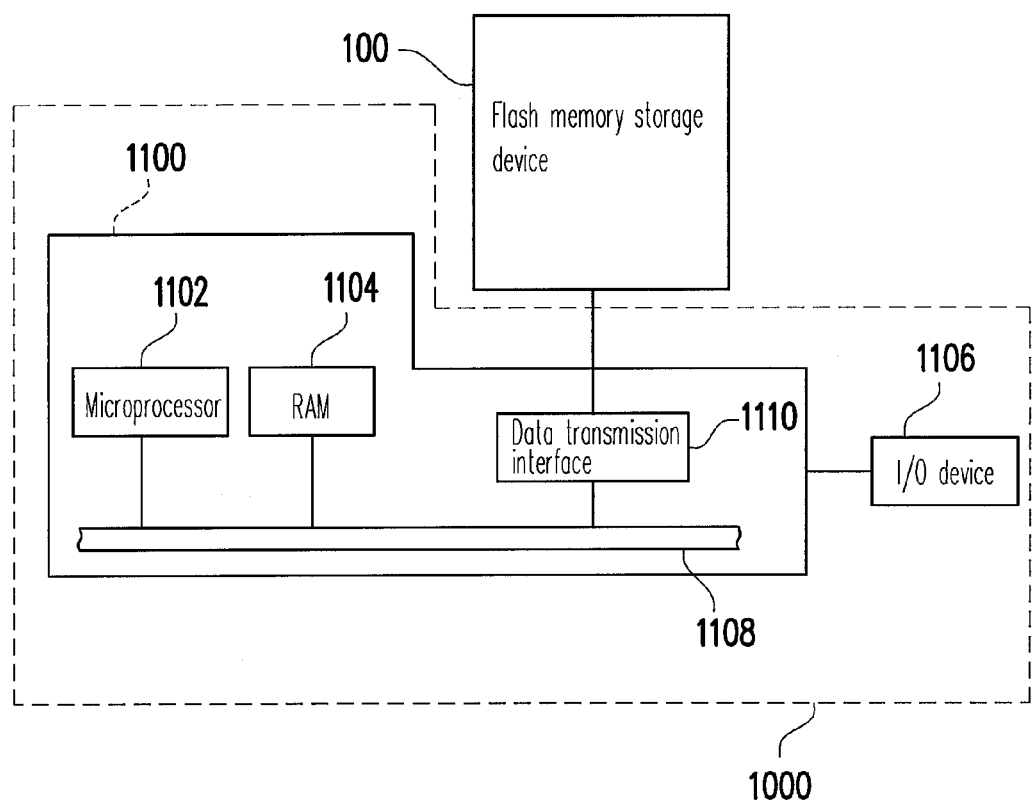
FIG. 1A is a schematic block diagram of a host system using a flash memory storage device according to a first exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A flash memory storage device usually includes a flash memory chip and a controller (also referred to as a control circuit). The flash memory storage device is usually used together with a host system so that the host system can write-in data into or read data from the flash memory storage device. Besides, a flash memory storage device may also include an embedded flash memory and a software that can be executed by a host system and act as a controller of the embedded flash memory.

First Exemplary Embodiment

FIG. 1A is a schematic block diagram of a host system and a flash memory storage device according to a first exemplary embodiment of the present invention.

Figure 1B:
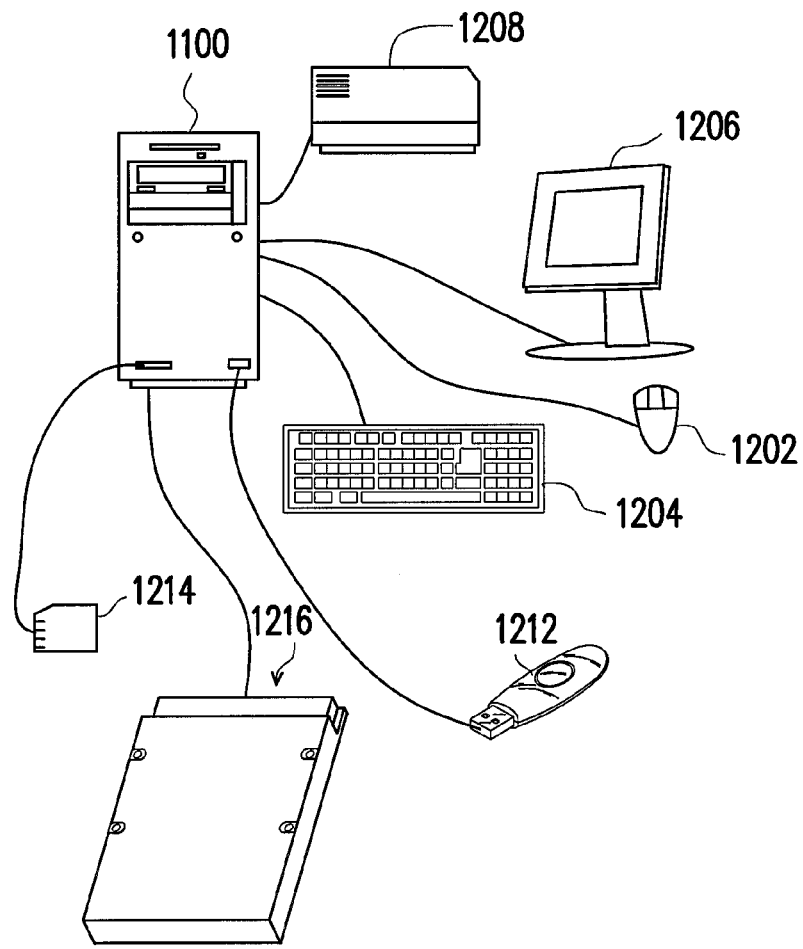
FIG. 1B is a schematic diagram of a computer, an input/output device, and a flash memory storage device according to an exemplary embodiment of the present invention.

Referring to FIG. 1A, a host system 1000 includes a computer 1100 and a input/output (I/O) device 1106. The computer 1100 includes a microprocessor 1102, a random access memory (RAM) 1104, a system bus 1108, and a data transmission interface 1110. For example, the I/O device 1106 includes a mouse 1202, a keyboard 1204, a display 1206 and a printer 1208 as shown in FIG. 1B. It should be understood that the devices illustrated in FIG. 1B are not intended to limiting the I/O device 1106, and the I/O device 1106 may further include other devices.

In the present embodiment, the flash memory storage device 100 is coupled to other devices of the host system 1000 through the data transmission interface 1110. The host system 1000 can write-in data into or read data from the flash memory storage device 100 through the operations of the microprocessor 1102, the RAM 1104, and the I/O device 1106. For example, the flash memory storage device 100 may be a flash drive 1212, a memory card 1214, or a solid state drive (SSD) 1216 as shown in FIG. 1B.

Figure 1C:
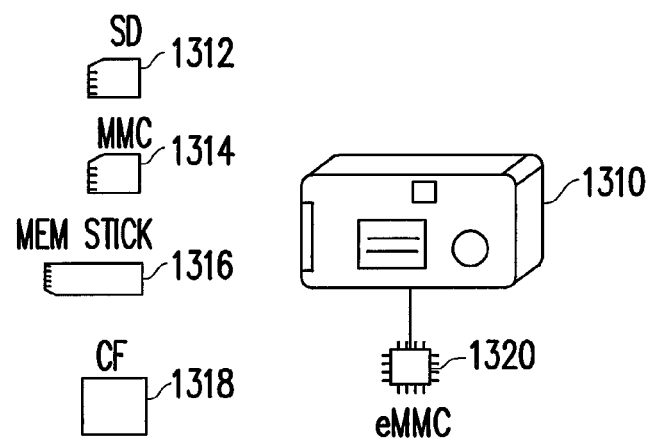
FIG. 1C is a schematic diagram of a host system using a flash memory storage device according to another exemplary embodiment of the present invention.

Generally speaking, the host system 1000 may be any system for storing data. Even though the host system 1000 is described as a computer system in the present exemplary embodiment, in another exemplary embodiment of the present invention, the host system 1000 may be a digital camera, a video camera, a telecommunication device, an audio player, or a video player. For example, if the host system is a digital camera (video camera) 1310, the flash memory storage device is then a SD card 1312, a MMC card 1314, a memory stick 1316, a CF card 1318 or an embedded storage device 1320 (as shown in FIG. 1C). The embedded storage device 1320 includes an embedded MMC (eMMC). It should be mentioned that the eMMC is directly coupled to a substrate of the host system.

Figure 1D:
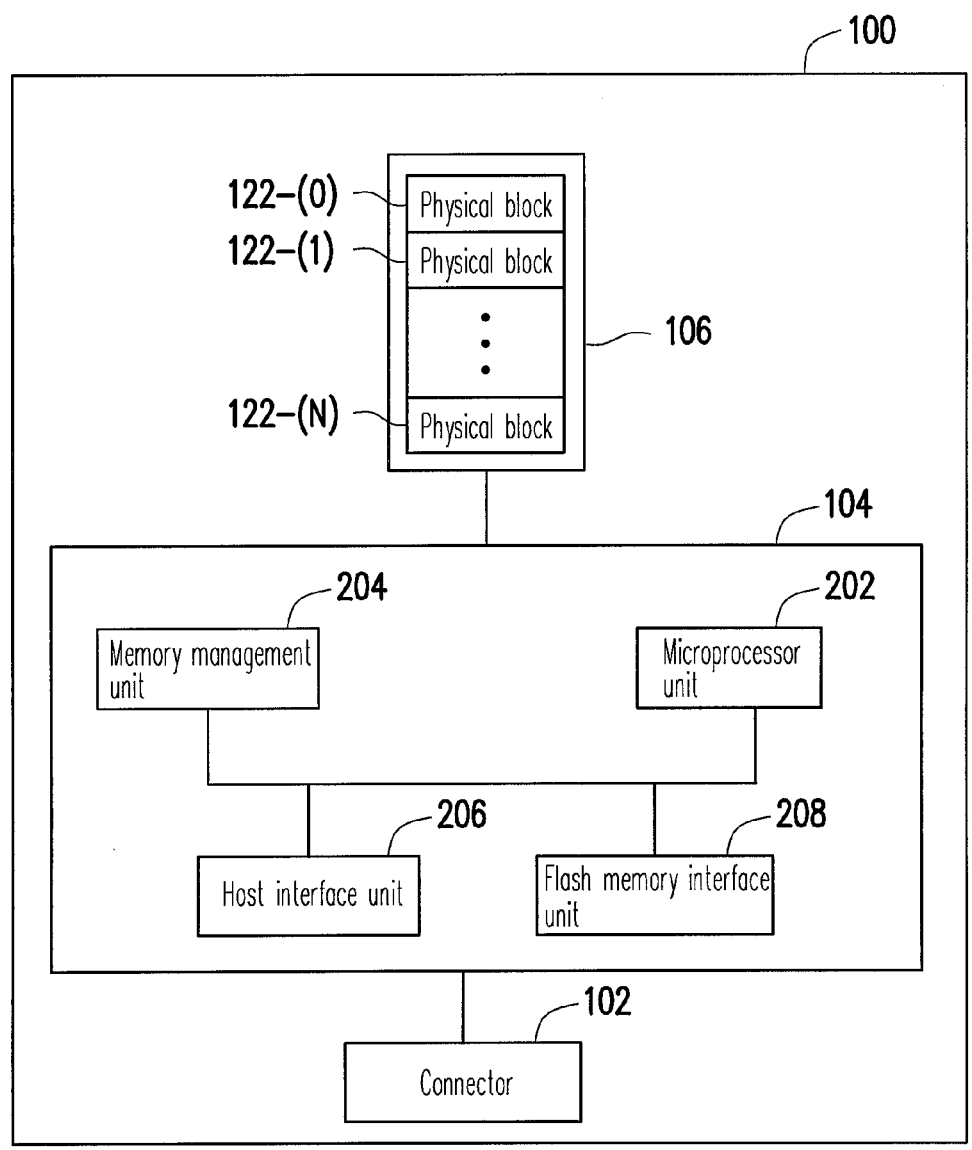
FIG. 1D is a detailed block diagram of the flash memory storage device in FIG. 1A.

FIG. 1D is a detailed block diagram of the flash memory storage device 100 in FIG. 1A.

Referring to FIG. 1D, the flash memory storage device 100 includes a connector 102, a flash memory controller 104, and a flash memory chip 106.

The connector 102 is coupled to the flash memory controller 104 and configured to couple to the host system 1000. In the present embodiment, the connector 102 is a serial advanced technology attachment (SATA) connector. However, the present invention is not limited thereto, and the connector 102 may also be a Parallel Advanced Technology Attachment (PATA) connector, a universal serial bus (USB) connector, an Institute of Electrical and Electronic Engineers (IEEE) 1394 connector, a peripheral component interconnect (PCI) express connector, a secure digital (SD) connector, a memory stick (MS) connector, a multi media card (MMC) connector, a compact flash (CF) connector, an integrated device electronics (IDE) connector, or other suitable connector.

The flash memory controller 104 executes a plurality of logic gates or control commands which are implemented in a hardware form or in a firmware form, so as to perform operations of writing, reading or erasing data in the flash memory chip 106 according to the commands of the host system 1000. The flash memory controller 104 includes a microprocessor unit 202, a memory management unit 204, a host interface unit 206 and a flash memory interface unit 208.

The microprocessor unit 202 is the main control unit of the flash memory controller 104, and cooperates with the memory management unit 204, the host interface unit 206, and the flash memory interface unit 208 to carry out various operations of the flash memory storage device 100.

The memory management unit 204 is coupled to the microprocessor unit 202, and executes a data writing mechanism and a block management mechanism according to the present exemplary embodiment. Below, the operation of the memory management unit 204 will be described in detail with reference to accompanying drawings.

In the present exemplary embodiment, the memory management unit 204 is implemented in the flash memory controller 104 as a firmware form. For example, the memory management unit 204 including a plurality of control instructions is burned into a program memory (for example, a read only memory (ROM)), and the program memory is embedded into the flash memory controller 104. When the flash memory storage device 100 is in operation, the control instructions of the memory management unit 204 are executed by the microprocessor unit 202 to accomplish the data writing mechanism and the block management mechanism according to the present embodiment.

In another exemplary embodiment of the present invention, the control instructions of the memory management unit 204 may also be stored in a specific area (for example, the system area in a flash memory exclusively used for storing system data) of the flash memory chip 106 as program codes. Similarly, when the flash memory storage device 100 is in operation, the program instructions of the memory management unit 204 are executed by the microprocessor unit 202. In addition, in yet another exemplary embodiment of the present invention, the memory management unit 204 may also be implemented in the flash memory controller 104 in a hardware form.

The host interface unit 206 is coupled to the microprocessor unit 202 and configured to receive and identify commands and data received from the host system 1000. Namely, the commands and data sent by the host system 1000 are passed to the microprocessor unit 202 through the host interface unit 206. In the present exemplary embodiment, the host interface unit 206 is a SATA interface corresponding to the connector 102. However, it is to be understood that the present invention is not limited thereto, and the host interface unit 210 may also be a PATA interface, a USB interface, an IEEE 1394 interface, a PCI Express interface, a SD interface, an MS interface, an MMC interface, a CF interface, an IDE interface, or other suitable types of interfaces for data transmission.

The flash memory interface unit 208 is coupled to the microprocessor unit 202 and configured to access the flash memory chip 106. Namely, data to be written into the flash memory chip 106 is converted by the flash memory interface unit 208 into a format acceptable to the flash memory chip 106.

Figure 2:
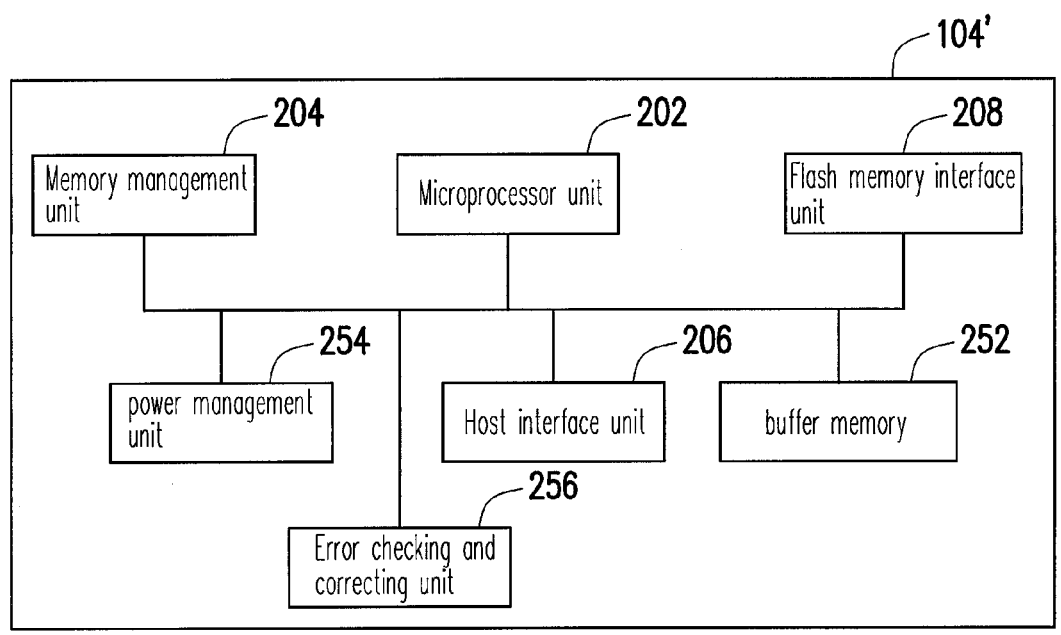
FIG. 2 is a schematic block diagram of a flash memory controller according to another exemplary embodiment of the present invention.

In another exemplary embodiment of the present invention, the flash memory controller may further include some general function modules. FIG. 2 is a schematic block diagram of a flash memory controller according to another exemplary embodiment of the present invention.

Referring to FIG. 2, besides the microprocessor unit 202, the memory management unit 204, the host interface unit 206 and the flash memory interface unit 208, a flash memory controller 104' further includes a buffer memory 252, a power management unit 254 and an error checking and correcting unit 256.

The buffer memory 252 is coupled to the microprocessor unit 202 and configured to temporarily store data and commands from the host system 1000 or data from the flash memory chip 106.

The power management unit 254 is coupled to the microprocessor unit 202 and configured to control the power of the flash memory storage device 100.

The error checking and correcting unit 256 is coupled to the microprocessor unit 202 and configured to perform an error checking and correcting process to ensure the correctness of data. To be specific, when the memory management unit 204 receives a host write command from the host system 1000, the error checking and correcting unit 256 generates an error checking and correcting code (ECC code) corresponding to write date of the host write command, and the memory management unit 204 writes the write-in data and the ECC code into the flash memory chip 106. And, when the memory management unit 204 reads data from the flash memory chip 106, the memory management unit 204 simultaneously reads the ECC code corresponding the read data, and the error checking and correcting unit 256 performs the error checking and correcting process to the read data based on the ECC code corresponding to the read data.

Referring to FIG. 1D again, the flash memory chip 106 is coupled to the flash memory controller 104 for storing data. The flash memory chip 106 has a plurality of physical blocks 122-(0)~122-(N). Each of the physical blocks 122-(0)~122-(N) is the smallest erasing unit. That is to say, each of the physical blocks has a minimum number of memory cells for being erased altogether. Each physical block has several pages. In the present exemplary embodiment, each of the pages is the smallest programming unit. In other words, each page is the smallest unit for writing data or reading data. Each of the pages usually includes a user data area and a redundancy area. The data area is used to store user data, and the redundancy area is used to store system data (for example, the ECC Code). In the exemplary embodiment, the flash memory chip 106 is a multi-level cell (MLC) NAND flash memory chip. However, the present invention is not limited thereto, and in another embodiment of the present invention, the flash memory chip 106 may also be a single level cell (SLC) NAND flash memory.

Figure 3A:
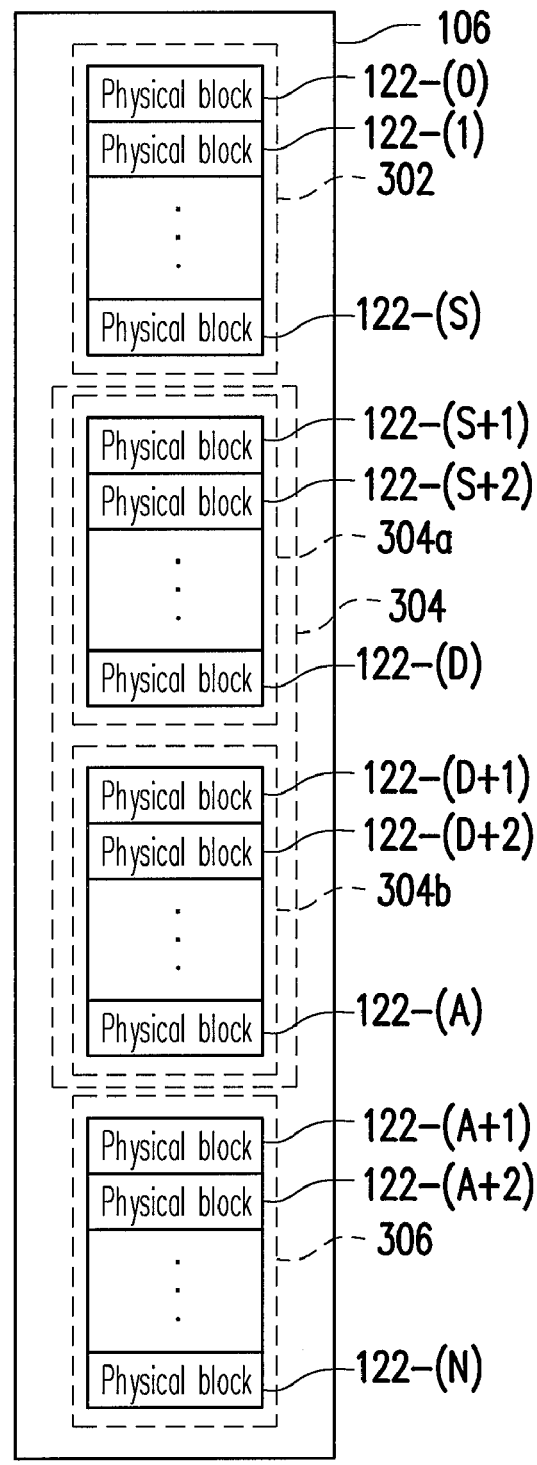
FIG. 3A is a schematic block diagram illustrating a flash memory chip according to the first exemplary embodiment of the present invention.

FIG. 3A is a schematic block diagram illustrating a flash memory chip according to the first exemplary embodiment of the present invention. It should be understood that terms, such as "get", "select", "move", "exchange", "replace", "alternate", "group", and so forth, are logical concepts which describe operations on the physical blocks. That is, the physical blocks of the flash memory are logically operated, but actual positions of the physical blocks are not changed.

Referring to FIG. 3A, the memory management unit 204 logically groups the physical blocks into a system area 302, a storage area 304, and a replacement area 306.

The physical blocks 122-(0)~122-(S) logically belonging to the system area 302 are configured to record system data, wherein the system data includes the manufacturer and model of the flash memory chip, the number of zones in flash memory chip, the number of physical blocks in each zone, and the number of pages in each physical block.

The physical blocks 122-(S+1)~122-(A) logically belonging to the storage area 304 are configured to store data written by the host system 1000. In other words, the flash memory storage device 100 uses the physical blocks in the storage area 304 to actually store data written by the host system 1000. In detail, the physical blocks 122-(S+1)~122-(A) in the storage area 304 further are grouped into a data area 304a and a spare area 304b. The physical blocks 122-(S+1)~122-(D) in the data area 304a are physical blocks which have stored data, and the physical blocks 122-(D+1)~122-(A) in the spare area 304b are physical blocks which do not have stored data. To be specific, when the memory management unit 204 gets a physical block from the spare area 304b to write data, the gotten physical block is linked to the data area 304a, and after a physical block originally linked to the data area 304a is erased, the erased physical block is linked to the spare area 304b.

The physical blocks 122-(A+1)~122-(N) logically belonging to the replacement area 306 are replacement physical blocks. For example, when the flash memory chip 106 is manufactured in the factory, 4% of the physical blocks thereof are reserved for replacement (i.e., the substitute physical units). That is, when any of the physical blocks in the system area 302 and the storage area 304 is damaged, the physical blocks reserved in the replacement area 306 are used for replacing the damaged physical blocks (i.e., bad blocks). Thus, if there are still available physical blocks in the replacement area 306 and a physical block is damaged, the memory management unit 204 gets an available physical block from the replacement area 306 for replacing the damaged physical block. If there is no more available physical block in the replacement area 306 and a physical block is damaged, the flash memory storage device 100 is announced as being in a write-protect status and data cannot be written therein.

Figure 3B:
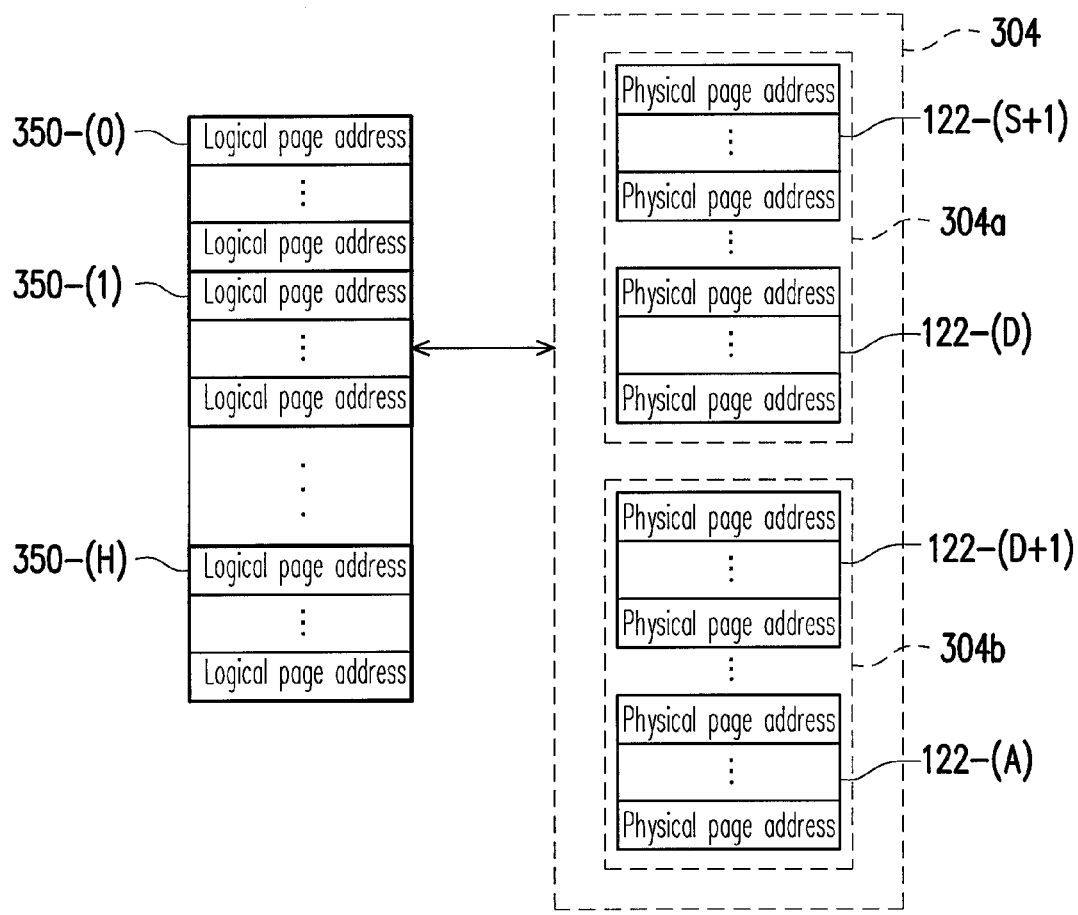
FIG. 3B is a diagram illustrating a mapping relationship between logical page addresses and physical page addresses according to the first exemplary embodiment of the present invention.

Because data from the host system 1000 is written into the flash memory storage device 100 in the alternative manner described above, the flash memory controller 204 provides logical page addresses to the host system 1000 for accessing data, and the memory management unit 204 groups the logical page addresses into logical blocks 350-(0)~350-(H), wherein the logical blocks 350-(0)~350-(H) are mapped to the physical blocks in the storage area 304 (as shown in FIG. 3B). For example, the memory management unit 204 maintains a logical page-physical page mapping table and a physical page-logical page mapping table to record the mapping relationships between the logical page addresses and the physical page addresses.

To be specific, in the exemplary embodiment of the present invention, when the host system 1000 writes data into the logical page addresses of the logical blocks 350-(0)~350-(H), the memory management unit 204 write the data into the physical page addresses of the physical blocks in the storage area 304. For example, when the memory management unit 204 starts to use the physical block 122-(D+1) for storing data to be written by the host system 1000, the memory management unit 204 orderly writes the data into the physical page addresses of the physical block 122-(D+1) regardless of the logical page addresses that the host system 1000 is about to write the data into; and when the memory management unit 204 starts to use the physical block 122-(D+2) for storing data to be written by the host system 1000, the memory management unit 204 orderly writes the data into the physical page addresses of the physical block 122-(D+2) regardless of the logical page addresses that the host system 1000 is about to write the data into. That is, when the host system 1000 is about to store data in the flash memory storage device 100, the memory management unit 204 orderly uses the physical page addresses in one physical block to write data, and only when all of the physical page addresses in the physical block have stored data, the memory management unit 204 selects another physical block which is empty (i.e., the memory management unit 204 gets one physical block from the spare area 304*b*) and orderly writes the data into the physical page addresses of the newly selected physical block. In the exemplary embodiment, after the memory management unit 204 writes the data into the physical page addresses, the memory management unit 204 updates the logical page-physical page mapping table and the physical page-logical page mapping table to correctly record the mapping relationships between the logical page addresses and the physical page addresses.

It should be understood that the grouping relationships about which physical blocks belong to the system area 302, the data area 304*a*, the spare area 304*b* and the replacement area 306 among the physical blocks 122-(0)~122-(N) are dynamically changed in the operations of the flash memory storage device 100. To be specific, after the memory management unit 204 writes data into a physical block (e.g., the physical block 122-(D+2)) originally linked to the spare area 304*b*, the physical block is linked to the data area 304*a*. Additionally, when a physical block in the data area 304*a* (or the spare area 304*b*) is damaged and replaced with a physical block in the replacement area 306, the physical block originally linked to the replacement area 306 is linked to the data area 304*a* (or the spare area 304*b*).

Noticeably, in the embodiment of the present invention, the memory management unit 204 further comprises an available physical page pointer for pointing out a next physical page address which is available for being written (referring to a next available physical page address, hereafter). Therefore, when the flash memory controller 104 executes the host write command from the host system 1000 to write date, the memory management unit 204 writes the data into the physical page addresses of the flash memory chip 106 in order according to the available physical page pointer. Here, the physical block that the next available physical page address belongs to is referred to "a next available physical block".

FIG. 4A and FIG. 4B are diagrams illustrating a logical page-physical page mapping table and a physical page-logical page mapping table according to an example of the first exemplary embodiment of the present invention, wherein the logical block 350-(0)~350-(H) include logical page addresses LBA-(0)~LBA(L) and the physical blocks in the storage area 304 include physical page addresses PBA-(0)~PBA-(K). In the exemplary embodiment, the logical page-physical page mapping table has a logical page index field and a physical page address field for recording the physical pages mapped to the logical pages, and the physical page-logical page mapping table has a physical page index field and a logical page address field to record the logical pages mapped to the physical pages.

Referring to FIGS. 4A and 4B, it is assumed that the logical page addresses LBA-(0)~LBA-(L) is mapped to the physical page addresses PBA-(0)~PBA-(L), respectively. That is, the physical page addresses PBA-(0)~PBA-(L) have been stored data written in the logical page addresses LBA-(0)~LBA-(L) by the host system 1000. Therefore, the mapping relationships are recorded in the logical page-physical page mapping table 410 and the physical page-logical page mapping table 420, and the available physical page pointer points to the physical page address PBA-(L+1).

FIG. 5A and FIG. 5B are diagrams illustrating the logical page-physical page mapping table and the physical page-logical page mapping table according to another example of the first exemplary embodiment of the present invention.

Referring to FIGS. 5A and 5B, when the host system 1000 is about to write-in data into the logical page address LBA-(1) under the status shown in FIGS. 4A and 4B, the memory management unit 204 writes the data to be written by the host system 1000 into the physical page address PBA-(L+1) according to the available physical page pointer, and makes the available physical page pointer to point to the physical page address PBA-(L+2). At this time, the memory management unit 204 updates the mapping relationships in the logical page-physical page mapping table 410 to map the logical page address LBA-(1) to the physical page address PBA-(L+1), and updates the mapping relationships in the physical page-logical page mapping table 420 to map the physical page address PBA-(L+1) to the logical page address LBA-(1).

FIG. 6A and FIG. 6B are diagrams illustrating the logical page-physical page mapping table and the physical page-logical page mapping table according to another example of the first exemplary embodiment of the present invention.

Referring to FIGS. 6A and 6B, when the host system 1000 is about to write data into the logical page address LBA-(129) under the status shown in FIGS. 5A and 5B, the memory management unit 204 writes the data to be written by the host system 1000 into the physical page address PBA-(L+2) according to the available physical page pointer, and makes the available physical page pointer to point to the physical page address PBA-(L+3). At this time, the memory management unit 204 updates the mapping relationships in the logical page-physical page mapping table to map 410 the logical page address LBA-(129) to the physical page address PBA-(L+2), and updates the mapping relationships in the physical page-logical page mapping table 420 to map the physical page address PBA-(L+2) to the logical page address LBA-(129).

Additionally, in the exemplary embodiment, the memory management unit 204 compares the records in the logical page-physical page mapping table 410 and the physical page-logical page mapping table 420 to determine which physical page addresses are invalid physical page addresses and valid physical page addresses. Here, the invalid physical page addresses are the physical page addresses stored old and invalid data, and the valid physical page addresses are the physical page addresses stored valid data and the valid physical page addresses currently are mapped to the logical page addresses.

For example, taking FIGS. 6A and 6B as an example, during the step of determining whether the physical page address PBA-(0) is the valid physical page address, the memory management unit 204 identifies that the logical page address which is mapped to the physical page address PBA-(0) is the logical page address LBA-(0) according to the physical page to logical page 420, and identifies that the physical page address which is mapped to the logical page address LBA-(0) is the physical page address PBA-(0) according to the logical page-physical page mapping table 410. Hence, the physical page address PBA-(0) is the valid physical page address. Furthermore, during the step of determining whether the physical page address PBA-(1) is the valid physical page address, the memory management unit 204 identifies that the logical page address which is mapped to the physical page address PBA-(1) is the logical page address LBA-(1) according to the physical page to logical page 420, and identifies that the physical page address which is mapped to the logical page address LBA-(1) is the physical page address PBA-(L+1) according to the logical page-physical page mapping table 410. Hence, the physical page address PBA-(1) is the invalid physical page address. That is, the memory management unit 204 identifies a mapped logical page address mapping to the physical page address to be determined according to the physical page-logical page mapping table 420 and identifies a mapped physical page address mapping to the mapped logical page address according to the logical page-physical page mapping table 410. When the physical page address to be determined is identical to the mapped physical page address, the physical page address to be determined is the valid physical page address. Otherwise, the physical page address to be determined is the invalid physical page address.

Noticeably, since the physical block is the minimum unit to be erased in the flash memory chip 106, the memory management unit 204 may merge the data in the valid physical page addresses so as to release the invalid physical page addresses for being written with new data. For example, the memory management unit 204 copies the data in the valid physical page addresses within at least one physical block to the physical page addresses within a physical block which is not written with data and an erase operation is carried out on the at least one physical block. Therefore, the dispersed valid data is merged and the invalid physical page addresses are released, which is denoted as the invalid data erasing process hereafter.

For example, after the valid data is merged to release invalid physical page addresses, the memory management unit 204 updates the physical page-logical page mapping table 420 to set the mapping relationships corresponding to the physical page address of the erased physical block as "NULL".

In particular, as described above, the flash memory storage device 100 alternatively used the physical blocks to store data. Therefore, in order to make the flash memory storage device 100 normally operating, the memory management unit 204 determines whether the number of physical blocks in the spare area 304b is smaller than a spare physical block threshold value before getting a physical block from the spare area 304b every time. If the number of physical blocks in the spare area 304b is smaller than the spare physical block threshold value, the memory management unit 204 performs the invalid data erasing process to erase the physical block stored invalid data and link the erased physical block to the spare area 304b for releasing the physical block stored invalid data. For example, the spare physical block threshold value is set to 5. However, it should be noticed that the present invention is not limited thereto and the spare physical block threshold value may be set to other suitable values.

It should be mentioned that the foregoing mapping relationships shown in FIG. 3 and the writing operation shown in FIGS. 4A, 4B, 5A, 5B, 6A and 6B also are referred as "the page-based flash memory management mode".

In the exemplary embodiment, the memory management unit 204 uses the page-based flash memory management mode to write data and ensures that a degree of data dispersion (referred to "a data dispersion degree" hereinafter) of each of the logical blocks is not larger than a logical block data dispersion degree threshold value (referred to "LBDDD threshold value" hereinafter). To be specific, the host system 1000 does not write data into the logical page addresses LBA-(0)~LBA(L) certainly according to the order of the logical page addresses LBA-(0)~LBA(L). Therefore, after the writing operations of the flash memory storage device 100 are executed repeatedly, the data belonging to the same logical block may be dispersed to several physical blocks, wherein the data dispersion degree of the logical block means the number of physical blocks used to store data of the logical block. In the exemplary embodiment, the LBDDD threshold value is any integer value which is larger than 0. For example, the LBDDD threshold value is set to 2, 4, 8, or 16.

In the exemplary embodiment, when the host interface unit 206 receives a host write command and data to be written, the memory management unit 204 identifies the logical block that the logical page address instructed in the host write command belongs to. Herein, the logical page address instructed in the current host write command is referred to "the written logical page address", and the logical block that the written logical page address belongs to is referred to "the written logical block". For example, the memory management unit 204 gets the logical block that the logical page addresses instructed in the host write command belongs to by using a mathematic operation formula, or obtains the logical block that the logical page addresses instructed in the host write command belongs to according to the logical address-logical block mapping table. And, the memory management unit 204 selects a physical page address to write the data based on the data dispersion degree of the written logical block, the next available physical page address and the LBDDD threshold value.

FIGS. 7A, 7B and 7C are diagrams illustrating an example of writing data according to the first embodiment of the present invention, wherein it is assumed that each physical block has 4 physical page addresses and the LBDDD threshold value is 2.

Referring to FIG. 7A, it is assumed that data of the logical block 350-(0) has been stored in two of the physical page addresses in the physical block 122-(S+1) and data of the logical block 350-(3) has been stored in another two of the physical page addresses in the physical block 122-(S+1); data of the logical block 350-(1) has been stored in all of the physical page addresses in the physical block 122-(S+2); data of the logical block 350-(2) has been stored in first two of the physical page addresses in the physical block 122-(D); and the next available physical page address that the available physical page pointer points to is the third physical page address of the physical block 122-(D).

Referring to FIG. 7B, when the host interface unit 206 receives a host write command and the write-in data corresponding to the host write command from the host system 1000 and the memory management unit 204 identifies that the logical page address to be written by the host system 1000 belongs to the logical block 350-(3), the memory management unit 204 identifies that the data dispersion degree of the logical block 350-(3) is 1 and there is no data of the logical block 350-(3) in the physical block 122-(D) that the next available physical page address belongs to. In the example, because the data dispersion degree of the logical block 350-(3) is 1, which is smaller than the LBDDD threshold value, when the write-in data belonging to the logical block 350-(3) is written into the physical block 122-(D), the data dispersion degree of the logical block 350-(3) becomes 2, which is not larger than the LBDDD threshold value. Accordingly, the memory management unit 204 writes the write-in data into the third physical page address of the physical block 122-(D).

Referring to FIG. 7C, under the status shown in FIG. 7B and the next available physical page address that the available physical page pointer points to is the fourth physical page address of the physical block 122-(D), when the host interface unit 206 receives a host write command and the write-in data corresponding to the host write command from the host system 1000 and the memory management unit 204 identifies that the logical page address to be written by the host system 1000 belongs to the logical block 350-(3), the memory management unit 204 identifies that the data dispersion degree of the logical block 350-(3) is 2, which is equal to the LBDDD threshold value and other data of the logical block 350-(3) has been stored in the physical block 122-(D) that the next available physical page address belongs to. In the example, because a portion of data of the logical block 350-(3) has been stored in the physical block 122-(D) that the next available physical page address belongs to, when the write-in data belonging to the logical block 350-(3) is written into the physical block 122-(D), the data dispersion degree of the logical block 350-(3) still is 2, which is not larger than the LBDDD threshold value. Accordingly, the memory management unit 204 writes the write-in data into the fourth physical page address of the physical block 122-(D).

FIGS. 8A and 8B are diagrams illustrating another example of writing data according to the first embodiment of the present invention, wherein it is assumed that each physical block has 4 physical page addresses and the LBDDD threshold value is 2.

Referring to FIG. 8A, it is assumed that data of the logical block 350-(0) has been stored in two of the physical page addresses in the physical block 122-(S+1) and data of the logical block 350-(3) has been stored in another two of the physical page addresses in the physical block 122-(S+1); data of the logical block 350-(1) has been stored in three of the physical page addresses in the physical block 122-(S+2) and data of the logical block 350-(3) has been stored in another one of the physical page addresses in the physical block 122-(S+2); data of the logical block 350-(2) has been stored in first two of the physical page addresses in the physical block 122-(D); and the next available physical page address that the available physical page pointer points to is the third physical page address of the physical block 122-(D).

Referring to FIG. 8B, when the host interface unit 206 receives a host write command and the write-in data corresponding to the host write command from the host system 1000 and the memory management unit 204 identifies that the logical page address to be written by the host system 1000 belongs to the logical block 350-(3), the memory management unit 204 identifies that the data dispersion degree of the logical block 350-(3) is 2 and there is no data of the logical block 350-(3) in the physical block 122-(D) that the next available physical page address belongs to. In this example, the memory management unit 204 determines whether the empty storage space of the physical block 122-(D) is enough to store the write-in data and other data belonging to the logical block 350-(3). To be specific, because the data dispersion degree of the logical block 350-(3) can not be larger than 2, if the write-in data belonging to the logical block 350-(3) is about to be written into the physical block 122-(D), the memory management unit 204 must move other data stored in other physical block and belonging to the logical block 350-(3), such that the data dispersion degree of the logical block 350-(3) still is equal to or smaller than 2. Accordingly, in a case where the empty storage space of the physical block 122-(D) is enough to store the write-in data and all of data which belongs to the logical block 350-(3) in the other physical block (i.e., the physical block 122-(S+2)) among the physical blocks stored data of the logical block 350-(3) (i.e., the physical block 122-(S+1) and the physical block 122-(S+2)), the memory management unit 204 writes the write-in data and all of the data which belongs to the logical block 350-(3) in the physical block 122-(S+2) into the physical block 122-(D). Namely, in the status that the data of the logical block 350-(3) in the physical block 122-(S+1) has the size of two physical page addresses, the data of the logical block 350-(3) in the physical block 122-(S+2) has the size of one physical page address and the physical block 122-(D) only has one empty physical page address, the memory management unit 204 may move the data stored in the fourth physical page address of the physical block 122-(S+2) to the physical block 122-(D), and mark the fourth physical page address of the physical block 122-(S+2) as the invalid physical page address. Accordingly, the data dispersion degree of the logical block 350-(3) still is equal to 2.

Figure 9A:
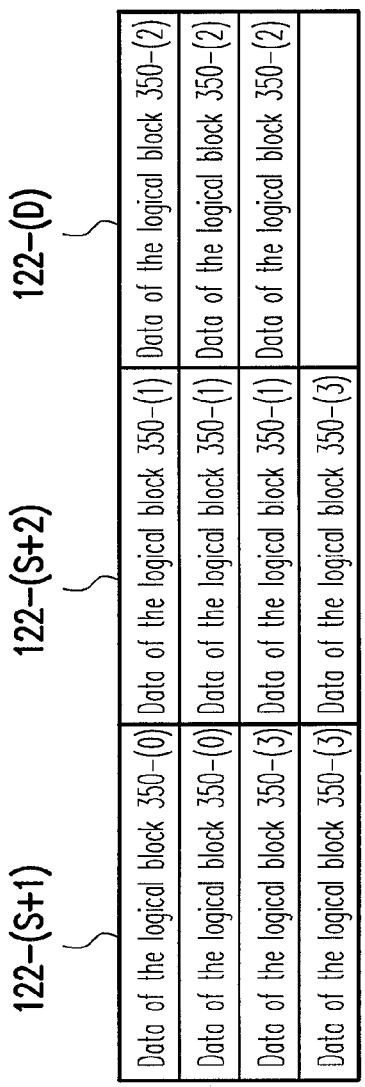
FIGS. 9A and 9B are diagrams illustrating another example of writing data according to the first embodiment of the present invention.
Figure 9B:
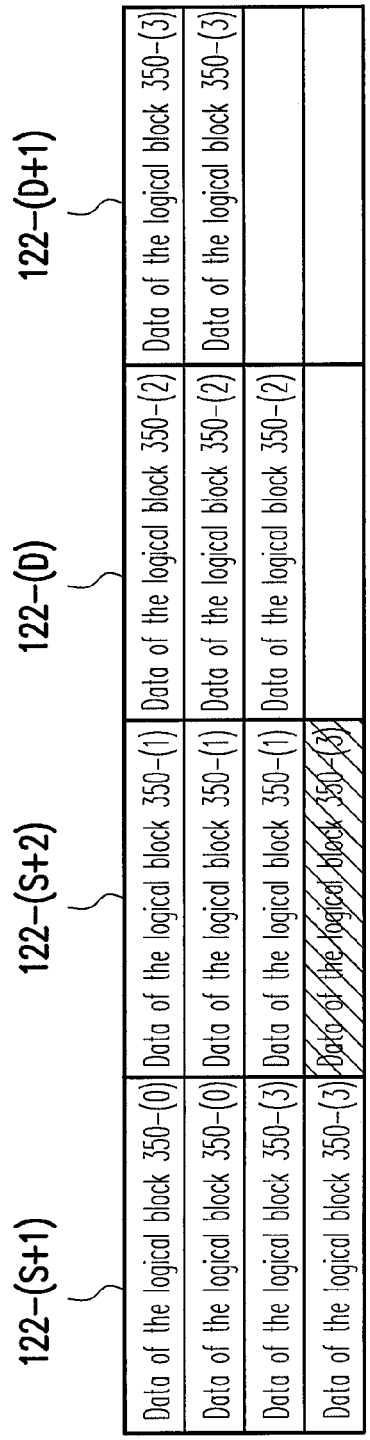

FIGS. 9A and 9B are diagrams illustrating another example of writing data according to the first embodiment of the present invention, wherein it is assumed that each physical block has 4 physical page addresses and the LBDDD threshold value is 2.

Referring to FIG. 9A, it is assumed that data of the logical block 350-(0) has been stored in two of the physical page addresses in the physical block 122-(S+1) and data of the logical block 350-(3) has been stored in another two of the physical page addresses in the physical block 122-(S+1); data of the logical block 350-(1) has been stored in three of the physical page addresses in the physical block 122-(S+2) and data of the logical block 350-(3) has been stored in another one of the physical page addresses in the physical block 122-(S+2); data of the logical block 350-(2) has been stored in first three of the physical page addresses in the physical block 122-(D); and the next available physical page address that the available physical page pointer points to is the fourth physical page address of the physical block 122-(D).

Referring to FIG. 9B, when the host interface unit 206 receives a host write command and the write-in data corresponding to the host write command from the host system 1000 and the memory management unit 204 identifies that the logical page address to be written by the host system 1000 belongs to the logical block 350-(3), the memory management unit 204 identifies that the data dispersion degree of the logical block 350-(3) is 2 and there is no data of the logical block 350-(3) in the physical block 122-(D) that the next available physical page address belongs to. In this example, the memory management unit 204 determines whether the empty storage space of the physical block 122-(D) is enough to store the write-in data and other data which has been written into other physical block (e.g., the physical block 122-(S+1) or the physical block 122-(S+2)) and belongs to the logical block 350-(3). In this example, because the empty storage space of the physical block 122-(D) is not enough to store the write-in data and all of the data which belongs to the logical block 350-(3) in any one of physical blocks stored data of the logical block 350-(3) (i.e., the physical block 122-(S+1) or the physical block 122-(S+2)), the memory management unit 204 gets one physical block (e.g., the physical block 122-(D+1)) from the spare area 304b and writes the write-in data and all of the data which belongs to the logical block 350-(3) in one of physical blocks stored data of the logical block 350-(3) into the physical block 122-(D+1). In the exemplary embodiment, a physical block which has less data needed to be moved has priority to be selected by the memory management unit 204. Therefore, the time for the movement of the data is reduced, preventing from substantially increasing the time for executing a host write command. That is, in this case, the memory management unit 204 moves the data stored in the fourth physical page address of the physical block 122-(S+2) to the physical block 122-(D+1), and mark the fourth physical page address of the physical block 122-(S+2) as the invalid physical page address. Accordingly, the data dispersion degree of the logical block 350-(3) still is 2.

Figure 10:
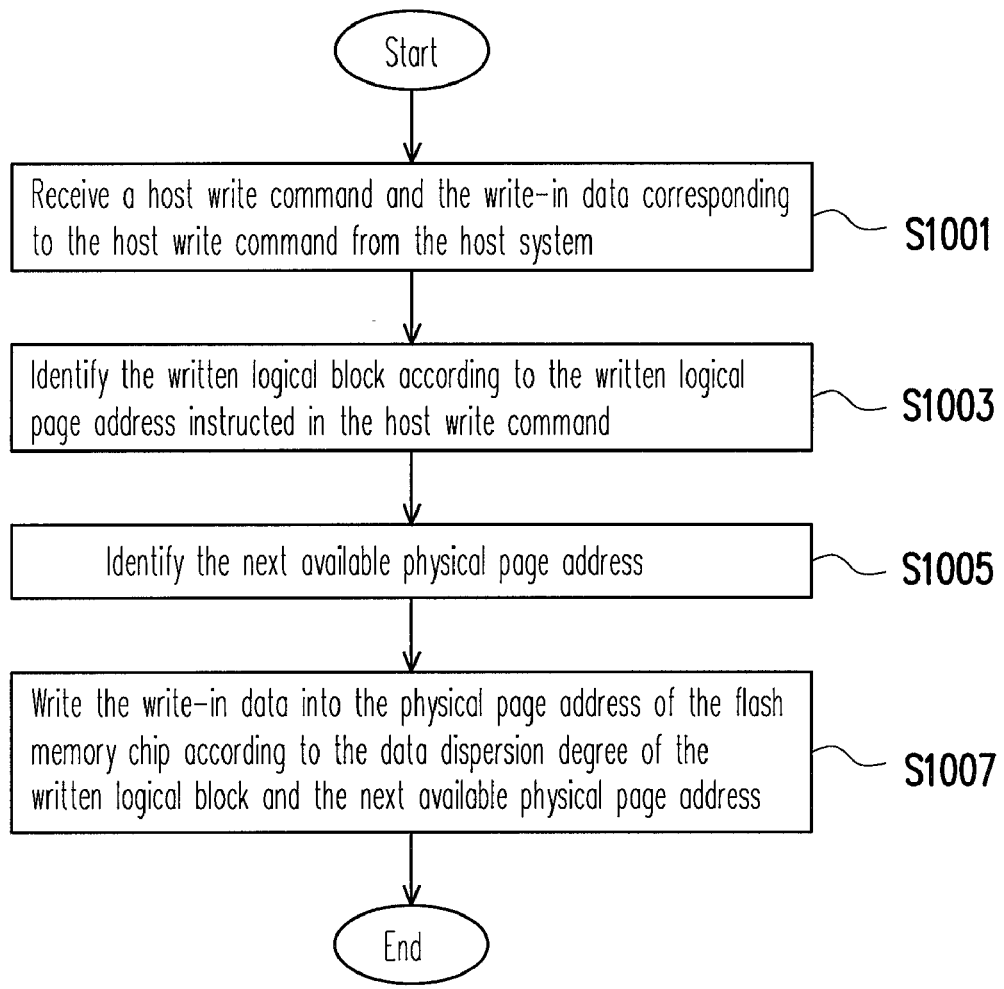
FIG. 10 is a flowchart illustrating a data writing method according to the first embodiment of the present invention.

FIG. 10 is a flowchart illustrating a data writing method according to the first embodiment of the present invention.

Referring to FIG. 10, in step S1001, the host interface unit 206 of the flash memory controller 104 receives a host write command and the write-in data corresponding to the host write command from the host system 1000 via the connector 102.

In step S1003, the memory management unit 204 identifies the written logical block according to the written logical page address instructed in the host write command, and in step S1005, the memory management unit 204 identifies the next available physical page address. For example, in step S1005, the memory management unit 204 identifies the next available physical page address according to the available physical page pointer.

Then, in step S1007, the memory management unit 204 writes the write-in data into the physical page address of the flash memory chip 106 according to the data dispersion degree of the written logical block and the next available physical page address.

Figure 11:
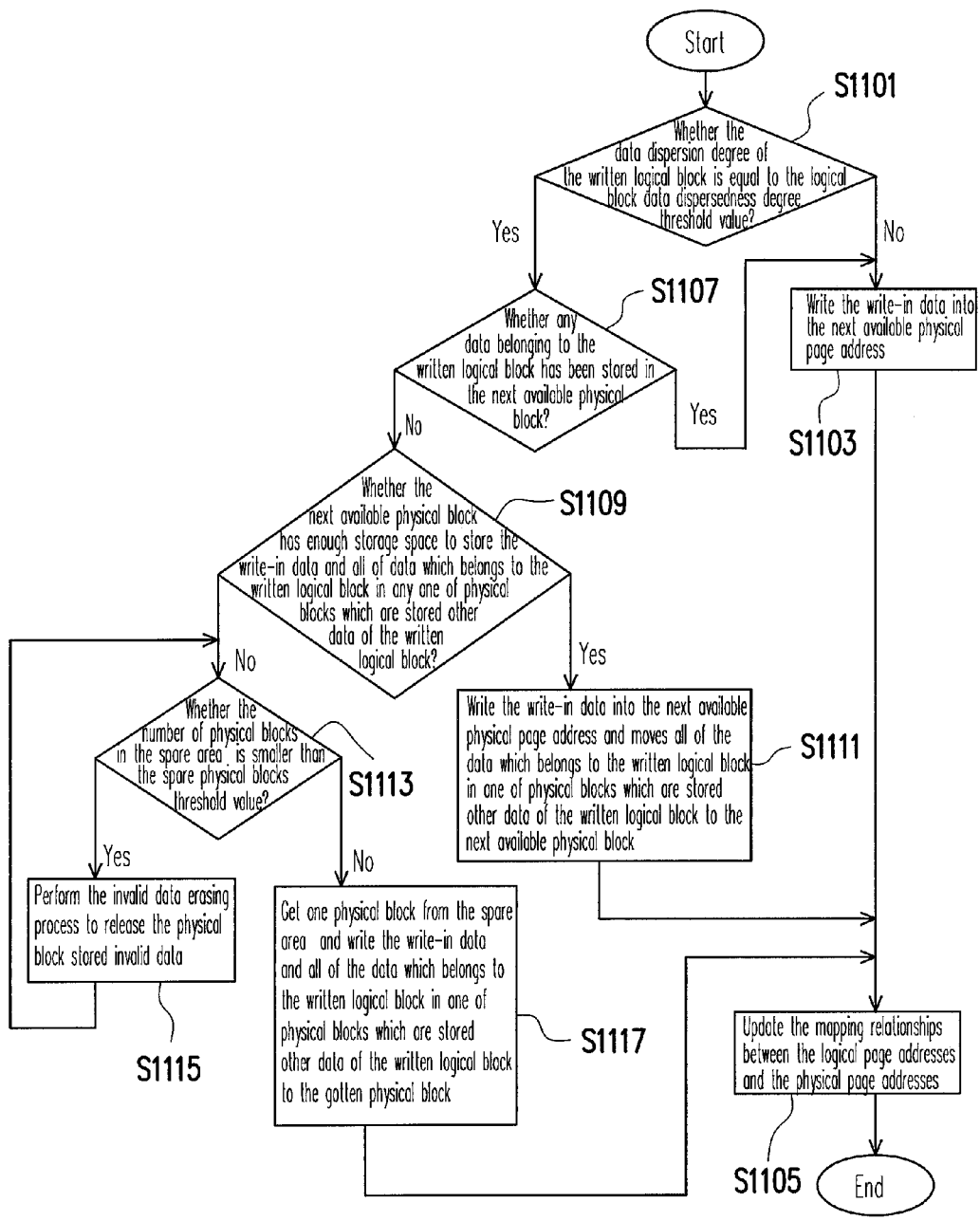
FIG. 11 is a flow chart illustrating detail steps of step S1007 in FIG. 10 according to the first exemplary embodiment of the present invention.

FIG. 11 is a flow chart illustrating detail steps of step S1007 in FIG. 10 according to the first exemplary embodiment of the present invention.

Referring to FIG. 11, in step S1101, the memory management unit 204 determines whether the data dispersion degree of the written logical block is equal to the LBDDD threshold value. Here, the memory management unit 204 ensures that the data dispersion degree of each logical block is not larger than the LBDDD threshold value. Therefore, the results of the determination in the step S1101 only include one result that the data dispersion degree of the written logical block is equal to the LBDDD threshold value or the other result that the data dispersion degree of the written logical block is smaller than the LBDDD threshold value. The case that the data dispersion degree of the written logical block is larger than the LBDDD threshold value would not occur.

If it is determined that the data dispersion degree of the written logical block is not equal to the LBDDD threshold value (i.e., the data dispersion degree of the written logical block is smaller than the LBDDD threshold value) in step S1101, the memory management unit 204 writes the write-in data into the next available physical page address (S1103). After that, in step S1105, the memory management unit 204 updates the mapping relationships between the logical page addresses and the physical page addresses, and the process shown in FIG. 11 is terminated. For example, the memory management unit 204 updates the logical page-physical page mapping table 410 and the physical page-logical page mapping table 420 to record the new mapping relationships between the logical page addresses and the physical page addresses.

If it is determined that the data dispersion degree of the written logical block is equal to the LBDDD threshold value according to step S1101, in step S1107, the memory management unit 204 determines whether any data belonging to the written logical block has been stored in the next available physical block (i.e., the physical block that the next available physical page address belongs to). If some data belonging to the written logical block has been stored in the next available physical block, step S1103 is executed.

If it is determined that there is no data belonging to the written logical block in the next available physical block according to step S1107, in step S1109, the memory management unit 204 determines whether the next available physical block has enough empty storage space to store the write-in data and all of the data which belongs to the written logical block in any one of physical blocks which are stored other data of the written logical block.

If it is determined that the next available physical block has enough empty storage space to store the write-in data and all of the data which belongs to the written logical block in one of physical blocks which are stored other data of the written logical block according to step S1109, in step S1111, the memory management unit 204 writes the write-in data into the next available physical page address and moves all of the data which belongs to the written logical block in one of physical blocks which are stored other data of the written logical block to the next available physical block. After that, step S1105 is executed.

If it is determined that the next available physical block does not have enough empty storage space to store the write-in data and all of the data which belongs to the written logical block in one of physical blocks which are stored other data of the written logical block according to step S1109, in step S1113, the memory management unit 204 determines whether the number of physical blocks in the spare area 304b is smaller than the spare physical block threshold value. If the number of physical blocks in the spare area 304b is smaller than the spare physical block threshold value, in step S1115, the memory management unit 204 performs the invalid data erasing process to release the physical block stored invalid data and step S1113 is executed.

If it is determined that the number of physical blocks in the spare area 304b is not smaller than the spare physical block threshold value, in step S1117, the memory management unit 204 gets one physical block from the spare area 304b and writes the write-in data and all of the data which belongs to the written logical block in one of physical blocks which are stored other data of the written logical block to the gotten physical block.

Second Exemplary Embodiment

A flash memory storage device and a host system in the second exemplary embodiment essentially are similar to the flash memory storage device and the host system in the first exemplary embodiment, wherein the difference is that the memory management unit in the first exemplary embodiment writes data into the flash memory chip according to the data dispersion degree of each logical block and a memory management unit in the second exemplary embodiment writes data into the flash memory chip according to the data dispersion degree of each logical block and the data dispersion degree of each physical block. Here, FIGS. 1A, 1D, 3A and 3B are used for describing the second exemplary embodiment of the present invention. In the second exemplary embodiment, the memory management unit 204 manages the flash memory chip 106 based on the page-based flash memory management mode exemplify shown in FIGS. 4A, 4B, 5A, 5B, 6A and 6B.

In the exemplary embodiment, the memory management unit 204 uses the page-based flash memory management mode to write data and ensures that the data dispersion degree of each of the logical blocks is not larger than the LBDDD threshold value and the data dispersion degree of each of the physical blocks is not larger than a physical block data dispersion degree threshold value (hereafter be shorted as PBDDD threshold value). Here, the data dispersion degree of the physical block means the number of logical blocks that data stored in the physical block belongs to. As described above, the host system 1000 does not write data into the logical page addresses certainly according to the order of the logical page addresses. Therefore, after the writing operations of the flash memory storage device 100 are executed repeatedly, the data belonging to several logical blocks may be stored in the same physical block. In the exemplary embodiment, the PBDDD threshold value is any integer value which is larger than 0. For example, the PBDDD threshold value is set to 2, 4, 8, or 16.

FIGS. 12A and 12B are diagrams illustrating an example of writing data according to the second embodiment of the present invention, wherein it is assumed that each physical block has 4 physical page addresses and the LBDDD threshold value is 2 and the PBDDD threshold value is also 2.

Referring to FIG. 12A, it is assumed that data of the logical block 350-(0) has been stored in three of the physical page addresses in the physical block 122-(S+1) and data of the logical block 350-(3) has been stored in another one of the physical page addresses in the physical block 122-(S+1); data of the logical block 350-(1) has been stored in three of the physical page addresses in the physical block 122-(S+2) and data of the logical block 350-(2) has been stored in another one of the physical page addresses in the physical block 122-(S+2); data of the logical block 350-(2) has been stored in one of the physical page addresses in the physical block 122-(D) and data of the logical block 350-(3) has been stored in another one of the physical page addresses in the physical block 122-(D); and the next available physical page address that the available physical page pointer points to is the third physical page address of the physical block 122-(D).

Referring to FIG. 12B, when the host interface unit 206 receives a host write command and the write-in data corresponding to the host write command from the host system 1000 and the memory management unit 204 identifies that the logical page address to be written by the host system 1000 belongs to the logical block 350-(3), the memory management unit 204 identifies that the data dispersion degree of the logical block 350-(3) is 2, the data dispersion degree of the physical block 122-(D) that the next available physical page address belongs to is 2 and other data belonging to the logical block 350-(3) has been stored in the physical block 122-(D). In this example, because other data of the logical block 350-(3) has been stored in the physical block 122-(D) that the next available physical page address belongs to, when the write-in data is written into the physical block 122-(D), the data dispersion degree of the physical block 122-(D) still is 2 and the data dispersion degree of the logical block 350-(3) still is 2. That is, the data dispersion degree of each of the logical blocks is not larger than the LBDDD threshold value and the data dispersion degree of each of the physical blocks is not larger than the PBDDD threshold value. Accordingly, the memory management unit 204 writes the write-in data into the next available physical page address that the available physical page pointer points to.

Figures 13A, 13B:
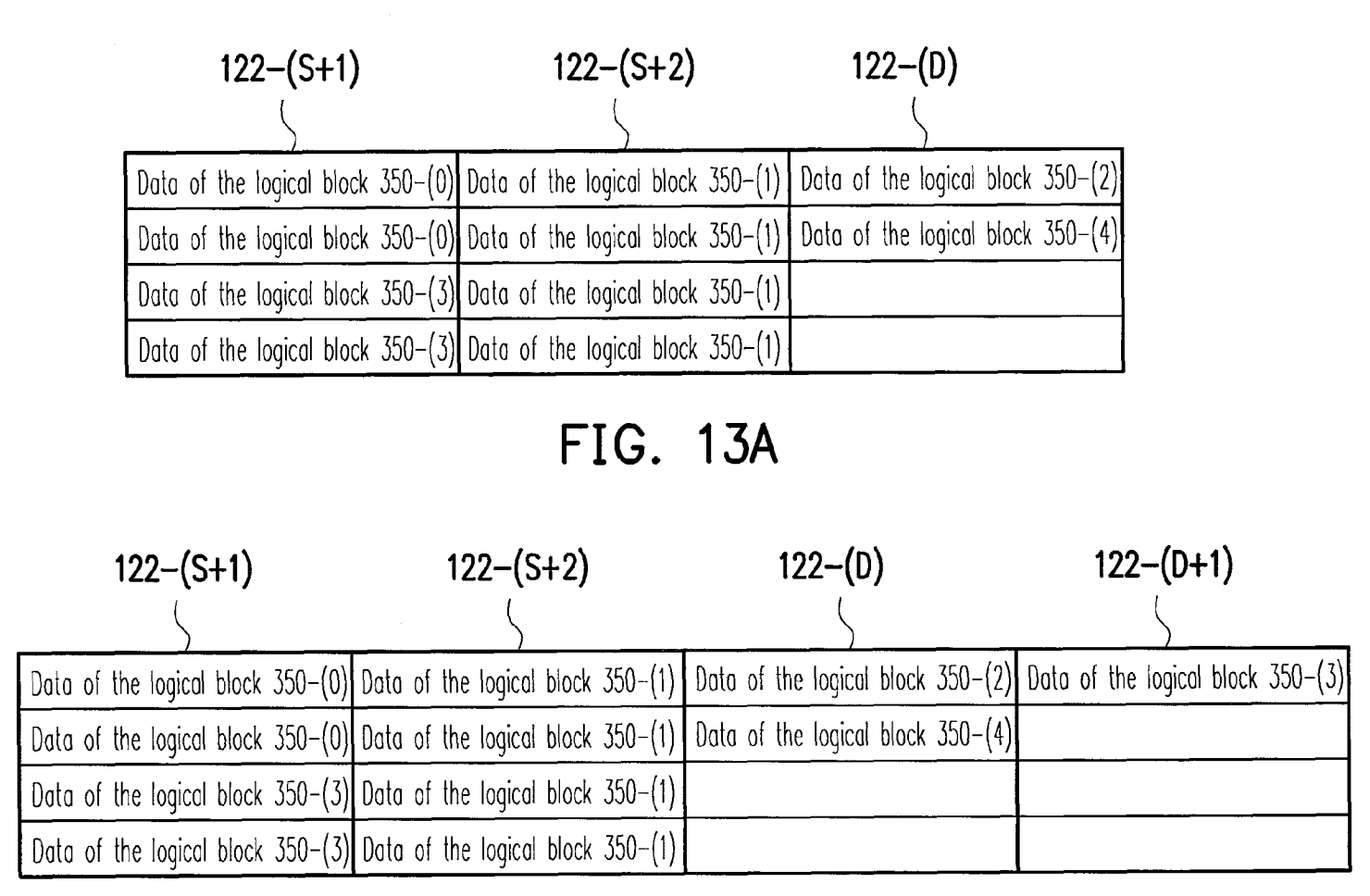

FIGS. 13A and 13B are diagrams illustrating another example of writing data according to the second embodiment of the present invention, wherein it is assumed that each physical block has 4 physical page addresses and the LBDDD threshold value is 2 and the PBDDD threshold value is also 2.

Referring to FIG. 13A, it is assumed that data of the logical block 350-(0) has been stored in two of the physical page addresses in the physical block 122-(S+1) and data of the logical block 350-(3) has been stored in another two of the physical page addresses in the physical block 122-(S+1); data of the logical block 350-(1) has been stored in all of the physical page addresses in the physical block 122-(S+2); data of the logical block 350-(2) has been stored in one of the physical page addresses in the physical block 122-(D) and data of the logical block 350-(4) has been stored in another one of the physical page addresses in the physical block 122-(D); and the next available physical page address that the available physical page pointer points to is the third physical page address of the physical block 122-(D).

Referring to FIG. 13B, when the host interface unit 206 receives a host write command and the write-in data corresponding to the host write command from the host system 1000 and the memory management unit 204 identifies that the logical page address to be written by the host system 1000 belongs to the logical block 350-(3), the memory management unit 204 identifies that the data dispersion degree of the logical block 350-(3) is 1, the data dispersion degree of the physical block 122-(D) that the next available physical page address belongs to is 2 and there is no data belonging to the logical block 350-(3) in the physical block 122-(D). In this example, when only the data dispersion degree of the logical block 350-(3) is considered, the write-in data belonging to the logical block 350-(3) can be written into the physical block 122-(D). However, the data dispersion degree of the physical block 122-(D) currently is 2, so the data dispersion degree of the physical block 122-(D) will become 3, which is larger than the PBDDD threshold value, if the write-in data belonging to the logical block 350-(3) is written into the physical block 122-(D). Therefore, in this example, the memory management unit 204 gets one physical block (e.g., the physical block 122-(D+1)) from spare area 304b and writes the write-in data into the gotten physical block. Accordingly, the memory management unit 204 makes that the data dispersion degree of the physical block 122-(D) still is 2, the data dispersion degree of the logical block 350-(3) is 2 and the data dispersion degree of the physical block 122-(D+1) is 1, such that the data dispersion degree of each of the logical blocks is not larger than the LBDDD threshold value and the data dispersion degree of each of the physical blocks is not larger than the PBDDD threshold value.

Figures 14A, 14B:
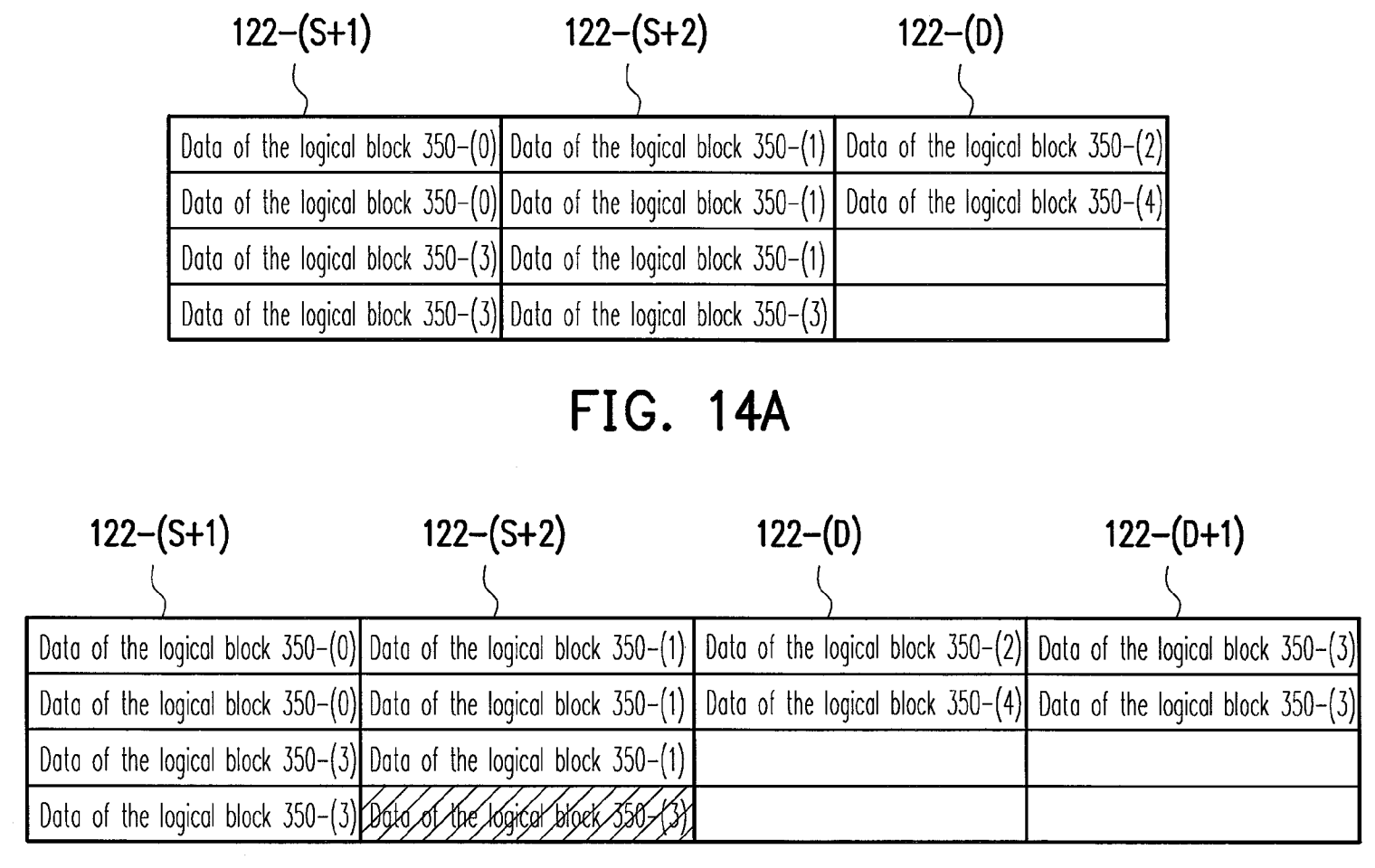

FIGS. 14A and 14B are diagrams illustrating another example of writing data according to the second embodiment of the present invention, wherein it is assumed that each physical block has 4 physical page addresses and the LBDDD threshold value is 2 and the PBDDD threshold value is also 2.

Referring to FIG. 14A, it is assumed that data of the logical block 350-(0) has been stored in two of the physical page addresses in the physical block 122-(S+1) and data of the logical block 350-(3) has been stored in another two of the physical page addresses in the physical block 122-(S+1); data of the logical block 350-(1) has been stored in three of the physical page addresses in the physical block 122-(S+2) and data of the logical block 350-(3) has been stored in another one of the physical page addresses in the physical block 122-(S+2); data of the logical block 350-(2) has been stored in one of the physical page addresses in the physical block 122-(D) and data of the logical block 350-(4) has been stored in another one of the physical page addresses in the physical block 122-(D); and the next available physical page address that the available physical page pointer points to is the third physical page address of the physical block 122-(D).

Referring to FIG. 14B, when the host interface unit 206 receives a host write command and the write-in data corresponding to the host write command from the host system 1000 and the memory management unit 204 identifies that the logical page address to be written by the host system 1000 belongs to the logical block 350-(3), the memory management unit 204 identifies that the data dispersion degree of the logical block 350-(3) is 2, the data dispersion degree of the physical block 122-(D) that the next available physical page address belongs to is 2 and there is no data belonging to the logical block 350-(3) in the physical block 122-(D). Similar to the example shown in FIGS. 13A and 13B, the data dispersion degree of the physical block 122-(D) currently is 2, so the data dispersion degree of the physical block 122-(D) will become 3, which is larger than the PBDDD threshold value, if the write-in data belonging to the logical block 350-(3) is written into the physical block 122-(D). Therefore, in this example, the memory management unit 204 gets one physical block (e.g., the physical block 122-(D+1)) from spare area 304*b* and writes the write-in data into the gotten physical block, so as to make that the data dispersion degree of each of the physical blocks is not larger than the PBDDD threshold value. Additionally, after the write-in data belonging to the logical block 350-(3) is written into the physical block 122-(D+1), the data dispersion degree of the logical block 350-(3) will become 3. Thus, the memory management unit 204 moves all of the data which belongs to the logical block 350-(3) in one of physical blocks (i.e., the physical block 122-(S+1) and the physical block 122-(S+1)) which are stored other data of the logical block 350-(3) to the physical block 122-(D+1), so as to make that the data dispersion degree of the logical block 350-(3) still is smaller than or equal to 2. In the exemplary embodiment, a physical block which has less data needed to be moved has priority to be selected by the memory management unit 204. Therefore, the time for the movement of the data is reduced, preventing from substantially increasing the time for executing a host write command. That is, in this case, the memory management unit 204 moves the data stored in the fourth physical page address of the physical block 122-(S+2) to the physical block 122-(D+1), and mark the fourth physical page address of the physical block 122-(S+2) as the invalid physical page address. Accordingly, the data dispersion degree of the logical block 350-(3) still is 2.

Figure 15:
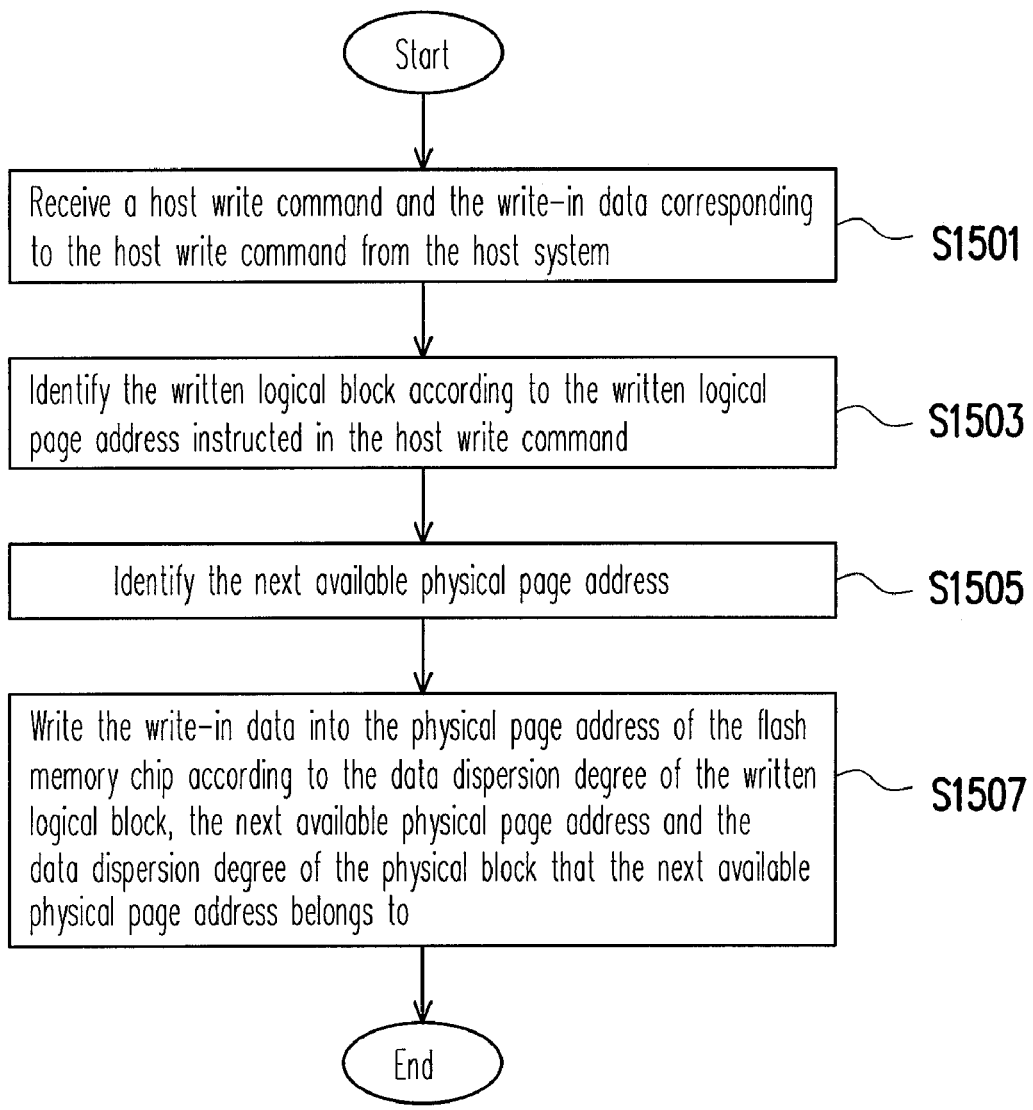
FIG. 15 is a flowchart illustrating a data writing method according to the second exemplary embodiment of the present invention.

FIG. 15 is a flowchart illustrating a data writing method according to the second exemplary embodiment of the present invention.

Referring to FIG. 15, in step S1501, the host interface unit 206 of the flash memory controller 104 receives a host write command and the writing data corresponding to the host write command from the host system 1000 via the connector 102.

In step S1503, the memory management unit 204 identifies the written logical block according to the written logical page address instructed in the host write command, and in step S1505, the memory management unit 204 identifies the next available physical page address. Then, in step S1507, the memory management unit 204 writes the write-in data into the physical page address of the flash memory chip 106 according to the data dispersion degree of the written logical block, the next available physical page address and the data dispersion degree of the physical block that the next available physical page address belongs to.

Figure 16A:
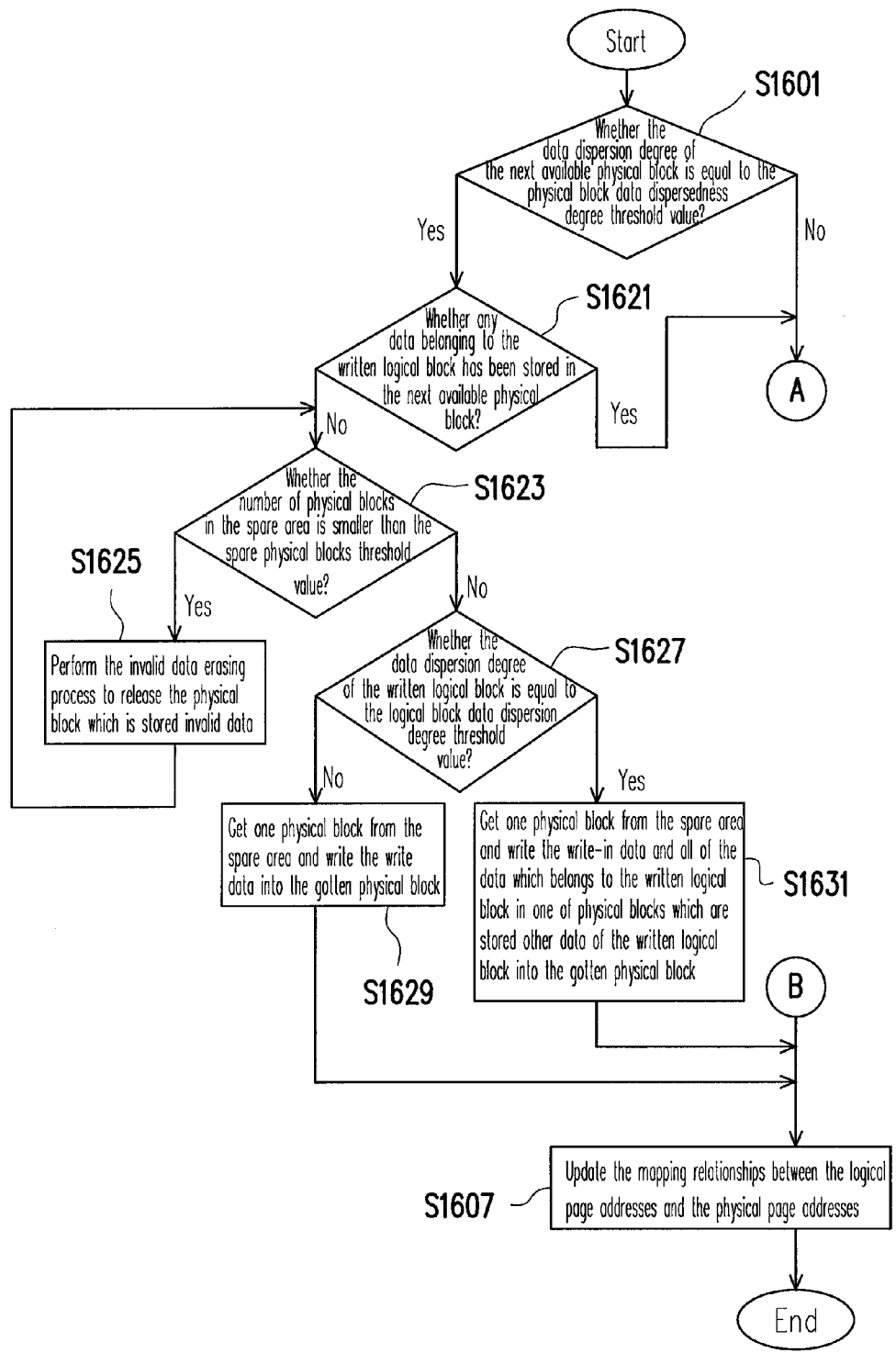
FIGS. 16A and 16B are flow charts illustrating detail steps of step S1507 in FIG. 15 according to the second exemplary embodiment of the present invention.
Figure 16B:
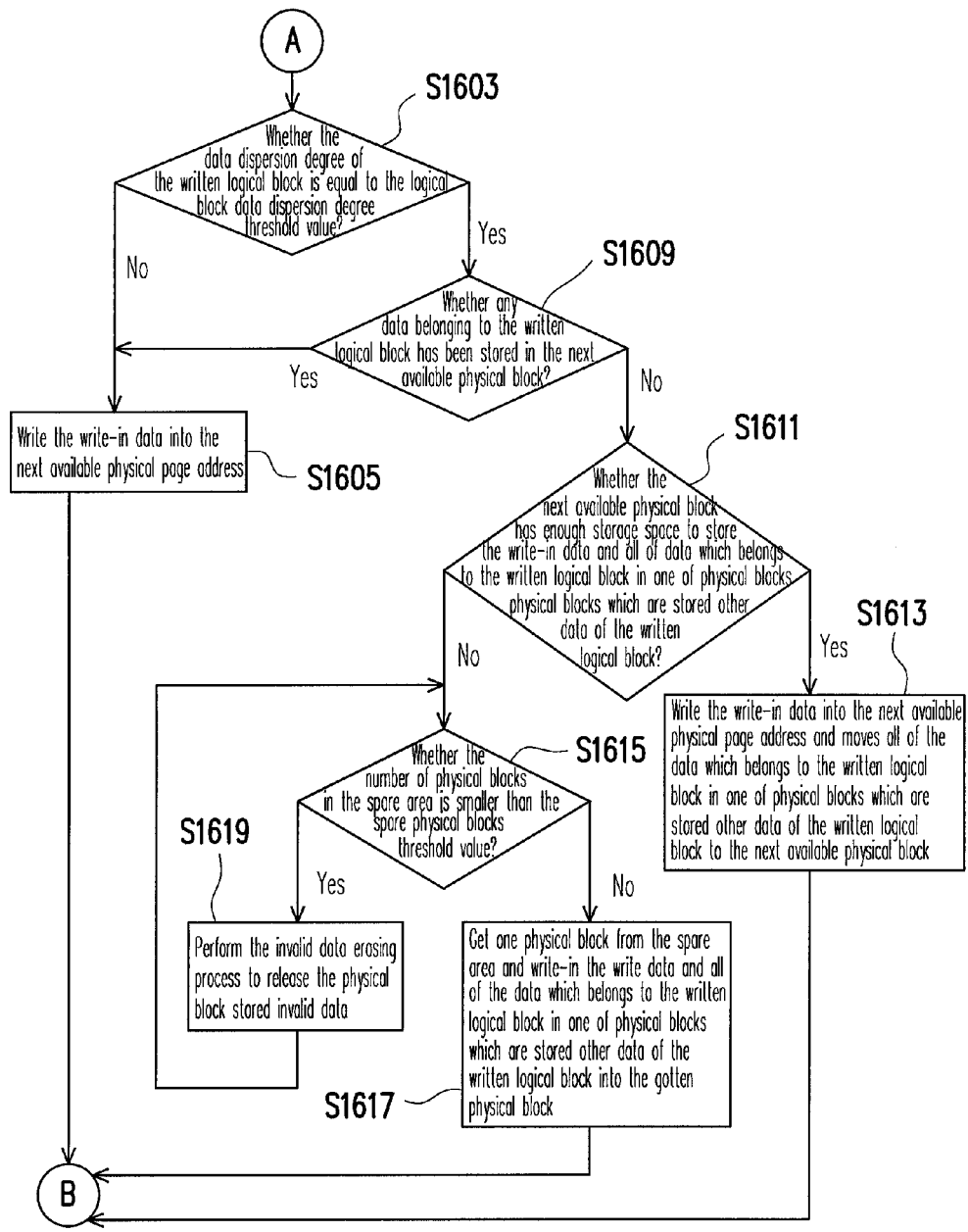

FIGS. 16A and 16B are flow charts illustrating detail steps of step S1507 in FIG. 15 according to the second exemplary embodiment of the present invention, wherein a potion of the steps of FIG. 16A are illustrated in FIG. 16B (i.e., the steps between node A and node B).

Referring to FIG. 16A, in step S1601, the memory management unit 204 determines whether the data dispersion degree of the next available physical block (i.e., the physical block that the next available physical page address belongs to) is equal to the PBDDD threshold value. Here, the memory management unit 204 ensures that the data dispersion degree of each of the physical blocks is not larger than the PBDDD threshold value. Therefore, the results of the determination in the step S1601 only include one result that the data dispersion degree of the physical block is equal to the PBDDD threshold value or the other result that the data dispersion degree of the physical block is smaller than the PBDDD threshold value. The case that the data dispersion degree of the physical block is larger than the PBDDD threshold value would not occur.

If it is determined that the data dispersion degree of the next available physical block is not equal to the PBDDD threshold value (i.e., the data dispersion degree of the next available physical block is smaller than the PBDDD threshold value) according to step S1601, step S1603 of FIG. 16B is executed.

Referring to FIG. 16B, in step S1603, the memory management unit 204 determines whether the data dispersion degree of the written logical block is equal to the LBDDD threshold value.

If it is determined that the data dispersion degree of the written logical block is not equal to the LBDDD threshold value (i.e., the data dispersion degree of the written logical block is smaller than the LBDDD threshold value) according to step S1603, the memory management unit 204 writes the write-in data into the next available physical page address (S1605). After that, step S1607 of FIG. 16A (i.e., the step after the node B) is executed. In step S1607, the memory management unit 204 updates the mapping relationships between the logical page addresses and the physical page addresses, and the process shown in FIG. 16A is terminated. For example, in step S1607, the memory management unit 204 updates the logical page-physical page mapping table 410 and the physical page-logical page mapping table 420 to record the new mapping relationships between the logical page addresses and the physical page addresses.

If it is determined that the data dispersion degree of the written logical block is equal to the LBDDD threshold value according to step S1603, in step S1609, the memory management unit 204 determines whether any data belonging to the written logical block has been stored in the next available physical block. If some data belonging to the written logical block has been stored in the next available physical block, step S1605 is executed.

If it is determined that there is no data belonging to the written logical block in the next available physical block according to step S1609, in step S1611, the memory management unit 204 determines whether the next available physical block has enough empty storage space to store the write-in data and all of the data which belongs to the written logical block in one of physical blocks which are stored other data of the written logical block.

If it is determined that the next available physical block has enough empty storage space to store the write-in data and all of the data which belongs to the written logical block in one of physical blocks which are stored other data of the written logical block according to step S1611, in step S1613, the memory management unit 204 writes the write-in data into the next available physical page address and moves all of the data which belongs to the written logical block in one of physical blocks which are stored other data of the written logical block to the next available physical block. After that, step S1607 of FIG. 16A is executed.

If it is determined that the next available physical block does not have enough empty storage space to store the write-in data and all of the data which belongs to the written logical block in one of physical blocks which are stored other data of the written logical block according to step S1611, in step S1615, the memory management unit 204 determines whether the number of physical blocks in the spare area 304*b* is smaller than the spare physical block threshold value. If it is determined that the number of physical blocks in the spare area 304*b* is not smaller than the spare physical block threshold value, in step S1617, the memory management unit 204 gets one physical block from the spare area 304*b* and writes the write-in data and all of the data which belongs to the written logical block in one of physical blocks which are stored other data of the written logical block into the gotten physical block. After that, step S1607 of FIG. 16A is executed.

If the number of physical blocks in the spare area 304b is smaller than the spare physical block threshold value according to step S1615, in step S1619, the memory management unit 204 performs the invalid data erasing process to release the physical block stored invalid data, and step S1615 is executed.

If it is determined that the data dispersion degree of the written logical block is equal to the LBDDD threshold value according to step S1601, in step S1621, the memory management unit 204 determines whether any data belonging to the written logical block has been stored in the next available physical block. If some data belonging to the written logical block has been stored in the next available physical block, step S1603 of FIG. 16B is executed.

If it is determined that there is no data belonging to the written logical block in the next available physical block according to step S1621, in step S1623, the memory management unit 204 determines whether the number of physical blocks in the spare area 304b is smaller than the spare physical block threshold value. If the number of physical blocks in the spare area 304b is smaller than the spare physical block threshold value, in step S1625, the memory management unit 204 performs the invalid data erasing process to release the physical block which is stored invalid data and step S1623 is executed.

If it is determined that the number of physical blocks in the spare area 304b is not smaller than the spare physical block threshold value according to step S1623, in step S1627, the memory management unit 204 determines whether the data dispersion degree of the written logical block is equal to the LBDDD threshold value. If it is determined that the data dispersion degree of the written logical block is not equal to the LBDDD threshold value, in step S1629, the memory management unit 204 gets one physical block from the spare area 304b and writes the write-in data into the gotten physical block. After that, step S1607 is executed.

If it is determined that the data dispersion degree of the written logical block is equal to the LBDDD threshold value according to step S1627, in step S1631, the memory management unit 204 gets one physical block from the spare area 304b and writes the write-in data and all of the data which belongs to the written logical block in one of physical blocks which are stored other data of the written logical block into the gotten physical block. After that, step S1607 is executed.

It should be mentioned that the memory management unit 204 moves all of the data which belongs to the written logical block in one of physical blocks stored other data of the written logical block to make that the data dispersion degree of the written logical block still is not larger than the LBDDD threshold value in the exemplary embodiment. However, the invention is not limited thereto, in another exemplary embodiment the memory management unit 204 can moves all of the data which belongs to the written logical block in several physical blocks which are stored other data of the written logical block, so as to make the data of the written logical block will be gathered.

It is understood that the examples shown in FIGS. 7A, 7B, 7C, 8A, 8B, 9A, 9B, 12A, 12B, 13A, 13B, 14A and 14B is used for explaining the present invention, but the present invention is not limited thereto. In the exemplary embodiment, the number of physical page addresses of each physical block in the flash memory chip 106 is 64, 128, 256 or more.

As described above, the data writing method provided by the present invention determines the physical page address for writing the write-in data according to the data dispersion degree of each logical block, thereby it effectively is prevented that data belonging the same logical block is dispersed in too many physical blocks. Accordingly, the time for arranging valid data is reduced, and the speed of executing a host write command is increased. Additionally, the data writing method provided by the present invention determines the physical page address for writing the write-in data according to the data dispersion degree of each logical block and the data dispersion degree of each physical block, thereby it is prevented that data belonging the same logical block is dispersed in many of physical blocks and data belonging many of logical blocks is stored in the same physical block. Accordingly, the time for arranging valid data further is reduced, and the speed of executing a host write command is increased. The previously described exemplary embodiments of the present invention have the advantages aforementioned, wherein the advantages aforementioned not required in all versions of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A data writing method, for writing data from a host system into a flash memory chip, wherein the flash memory chip includes a plurality of physical blocks and each of the physical blocks has a plurality of physical page addresses, the data writing method comprising:
    configuring a plurality of logical page addresses;
    grouping the logical page addresses into a plurality of logical blocks;
    recording a data dispersion degree of each of the logical blocks, wherein the data dispersion degree of the logical block is the number of the physical blocks stored data belonging to the corresponding logical block;
    receiving write-in data from the host system, wherein the write-in data is written into a first logical page address, the first logical page address belongs to a first logical block, the first logical page address is one of the logical page addresses, and the first logical block is one of the logical blocks;
    obtaining a first physical page address, wherein the first physical page address is one of the physical page addresses; and
    writing the write-in data into the flash memory chip according to the data dispersion degree of the first logical block and the first physical page address,
    wherein the data dispersion degree of each of the logical blocks is not larger than a logical block data dispersion degree threshold value.

2. The data writing method according to claim 1 further comprises at least grouping the physical blocks into a data area and a spare area.

3. The data writing method according to claim 1, wherein the step of writing the write-in data into the flash memory chip according to the data dispersion degree of the first logical block and the first physical page address comprises:
    when D1<TH1, writing the write-in data into the first physical page address, wherein D1 is the data dispersion degree of the first logical block, and TH1 is the logical block data dispersion degree threshold value.

4. The data writing method according to claim 2, wherein the step of writing the write-in data into the flash memory chip according to the data dispersion degree of the first logical block and the first physical page address further comprises:
when D1=TH1, determining whether other data of the first logical block has been stored in the physical block that the first physical page address belongs to;
writing the write-in data into the first physical page address when the other data of the first logical block has been stored in the physical block that the first physical page address belongs to;
determining whether empty storage space of the physical block that the first physical page address belongs to is enough to store the write-in data and all of the data belonging to the first logical block in one of the physical blocks stored the data of the first logical block when the other data of the first logical block has not been stored in the physical block that the first physical page address belongs to;
writing the write-in data into the first physical page address and moving all of the data belonging to the first logical block in one of the physical blocks stored the data of the first logical block into the physical block that the first physical page address belongs to when the empty storage space of the physical block that the first physical page address belongs to is enough to store the write-in data and all of the data belonging to the first logical block in one of the physical blocks stored the data of the first logical block; and
getting one of the physical blocks of the spare area and writing the write-in data and all of the data belonging to the first logical block in one of the physical blocks stored the data of the first logical block into the gotten physical block when the empty storage space of the physical block that the first physical page address belongs to is not enough to store the write-in data and all of the data belonging to the first logical block in one of the physical blocks stored the data of the first logical block,
wherein D1 is the data dispersion degree of the first logical block, and TH1 is the logical block data dispersion degree threshold value.

5. The data writing method according to claim 2, further comprising:
recording a data dispersion degree of each of the physical blocks, wherein the data dispersion degree of the physical block is the number of the logical blocks that data stored in the corresponding physical block belongs to.

6. The data writing method according to claim 5, wherein the step of writing the write-in data into the flash memory chip according to the data dispersion degree of the first logical block and the first physical page address comprises:
writing the write-in data into the flash memory chip according to the data dispersion degree of the first logical block, the first physical page address and the data dispersion degree of the physical block that the first physical page address belongs to,
wherein the data dispersion degree of each of the physical blocks is not larger than a physical block data dispersion degree threshold value.

7. The data writing method according to claim 6, wherein the step of writing the write-in data into the flash memory chip according to the data dispersion degree of the first logical block, the first physical page address and the data dispersion degree of the physical block that the first physical page address belongs to includes:
when D1<TH1 and D2<TH2, writing the write-in data into the first physical page address,
wherein D1 is the data dispersion degree of the first logical block, TH1 is the logical block data dispersion degree threshold value, D2 is the data dispersion degree of the physical block that the first physical page address belongs to, and TH2 is the physical block data dispersion degree threshold value.

8. The data writing method according to claim 6, wherein the step of writing the write-in data into the flash memory chip according to the data dispersion degree of the first logical block, the first physical page address and the data dispersion degree of the physical block that the first physical page address belongs to comprises:
when D1<TH 1 and D2=TH2, determining whether other data of the first logical block has been stored in the physical block that the first physical page address belongs to;
getting one of the physical blocks of the spare area and writing the write-in data into the gotten physical block when the other data of the first logical block has not been stored in the physical block that the first physical page address belongs to;
writing the write-in data into the first physical page address when the other data of the first logical block has been stored in the physical block that the first physical page address belongs to,
wherein D1 is the data dispersion degree of the first logical block, TH1 is the logical block data dispersion degree threshold value, D2 is the data dispersion degree of the physical block that the first physical page address belongs to, and TH2 is the physical block data dispersion degree threshold value.

9. The data writing method according to claim 6, wherein the step of writing the write-in data into the flash memory chip according to the data dispersion degree of the first logical block, the first physical page address and the data dispersion degree of the physical block that the first physical page address belongs to comprises:
when D1=TH1 and D2=TH2, determining whether other data of the first logical block has been stored in the physical block that the first physical page address belongs to;
getting one of the physical blocks of the spare area and writing the write-in data and all of the data belonging to the first logical block in one of the physical blocks stored the data of the first logical block into the gotten physical block when the other data of the first logical block has not been stored in the physical block that the first physical page address belongs to;
writing the write-in data into the first physical page address when the other data of the first logical block has been stored in the physical block that the first physical page address belongs to,
wherein D1 is the data dispersion degree of the first logical block, TH1 is the logical block data dispersion degree threshold value, D2 is the data dispersion degree of the physical block that the first physical page address belongs to, and TH2 is the physical block data dispersion degree threshold value.

10. The data writing method according to claim 6, wherein the step of writing the write-in data into the flash memory chip according to the data dispersion degree of the first logical block, the first physical page address and the data dispersion degree of the physical block that the first physical page address belongs to comprises:

- when D1=TH1 and D2<TH2, determining whether other data of the first logical block has been stored in the physical block that the first physical page address belongs to;
- writing the write-in data into the first physical page address when the other data of the first logical block has been stored in the physical block that the first physical page address belongs to;
- determining whether empty storage space of the physical block that the first physical page address belongs to is enough to store the write-in data and all of the data belonging to the first logical block in one of the physical blocks stored the data of the first logical block when the other data of the first logical block has not been stored in the physical block that the first physical page address belongs to;
- writing the write-in data into the first physical page address and moving all of the data belonging to the first logical block in one of the physical blocks stored the data of the first logical block into the physical block that the first physical page address belongs to when the empty storage space of the physical block that the first physical page address belongs to is enough to store the write-in data and all of the data belonging to the first logical block in one of the physical blocks stored the data of the first logical block; and
- getting one of the physical blocks of the spare area and writing the write-in data and all of the data belonging to the first logical block in one of the physical blocks stored the data of the first logical block into the gotten physical block when the empty storage space of the physical block that the first physical page address belongs to is not enough to store the write-in data and all of the data belonging to the first logical block in one of the physical blocks stored the data of the first logical block,
- wherein D1 is the data dispersion degree of the first logical block, TH1 is the logical block data dispersion degree threshold value, D2 is the data dispersion degree of the physical block that the first physical page address belongs to, and TH2 is the physical block data dispersion degree threshold value.

11. A flash memory controller, for writing data from a host system into a flash memory chip, wherein the flash memory chip comprises a plurality of physical blocks and each of the physical blocks has a plurality of physical page addresses, the flash memory controller comprising:

a microprocessor unit;

a flash memory interface unit, coupled to the microprocessor unit, and configured to couple to the flash memory chip;

a host interface unit, coupled to the microprocessor unit and configured to couple to the host system; and a memory management unit, coupled to the microprocessor unit and configured to configure a plurality of logical page addresses, group the logical page addresses into a plurality of logical blocks and record a data dispersion degree of each of the logical blocks, wherein the data dispersion degree of the logical block is the number of the physical blocks stored data belonging to the corresponding logical block, wherein the host interface unit receives write-in data from the host system, wherein the write-in data is written into a first logical page address, the first logical page address belongs to a first logical block, the first logical page address is one of the logical page addresses, and the first logical block is one of the logical blocks, wherein the memory management unit obtains a first physical page address, wherein the first physical page address is one of the physical page addresses, wherein the memory management unit writes the write-in data into the flash memory chip according to the data dispersion degree of the first logical block and the first physical page address, wherein the data dispersion degree of each of the logical blocks is not larger than a logical block data dispersion degree threshold value.

12. The flash memory controller according to claim 11, wherein the memory management unit at least groups the physical blocks into a data area and a spare area.

13. The flash memory controller according to claim 11, wherein when D1<TH1, the memory management unit writes the write-in data into the first physical page address, wherein D1 is the data dispersion degree of the first logical block, and TH1 is the logical block data dispersion degree threshold value.

14. The flash memory controller according to claim 12, wherein when D1=TH1, the memory management unit determines whether other data of the first logical block has been stored in the physical block that the first physical page address belongs to, wherein the memory management unit writes the write-in data into the first physical page address when the other data of the first logical block has been stored in the physical block that the first physical page address belongs to, wherein the memory management unit determines whether empty storage space of the physical block that the first physical page address belongs to is enough to store the write-in data and all of the data belonging to the first logical block in one of the physical blocks stored the data of the first logical block when the other data of the first logical block has not been stored in the physical block that the first physical page address belongs to, wherein the memory management unit writes the write-in data into the first physical page address and moves all of the data belonging to the first logical block in one of the physical blocks stored the data of the first logical block into the physical block that the first physical page address belongs to when the empty storage space of the physical block that the first physical page address belongs to is enough to store the write-in data and all of the data belonging to the first logical block in one of the physical blocks stored the data of the first logical block, wherein the memory management unit gets one of the physical blocks of the spare area and writes the write-in data and all of the data belonging to the first logical block in one of the physical blocks stored the data of the first logical block into the gotten physical block when the empty storage space of the physical block that the first physical page address belongs to is not enough to store the write-in data and all of the data belonging to the first logical block in one of the physical blocks stored the data of the first logical block, wherein D1 is the data dispersion degree of the first logical block, and TH1 is the logical block data dispersion degree threshold value.

15. The flash memory controller according to claim 12, wherein the memory management unit records a data dispersion degree of each of the physical blocks, wherein the data dispersion degree of the physical block is the number of the logical blocks that data stored in the corresponding physical block belongs to.

16. The flash memory controller according to claim 15, wherein the memory management unit writes the write-in data into the flash memory chip further according to the data dispersion degree of the physical block that the first physical page address belongs to,
wherein the data dispersion degree of each of the physical blocks is not larger than a physical block data dispersion degree threshold value.

17. The flash memory controller according to claim 16, wherein when D1<TH1 and D2<TH2, the memory management unit writes the write-in data into the first physical page address,
wherein D1 is the data dispersion degree of the first logical block, TH1 is the logical block data dispersion degree threshold value, D2 is the data dispersion degree of the physical block that the first physical page address belongs to, and TH2 is the physical block data dispersion degree threshold value.

18. The flash memory controller according to claim 16, wherein when D1<TH1 and D2=TH2, the memory management unit determines whether other data of the first logical block has been stored in the physical block that the first physical page address belongs to,
wherein the memory management unit gets one of the physical blocks of the spare area and writes the write-in data into the gotten physical block when the other data of the first logical block has not been stored in the physical block that the first physical page address belongs to,
wherein the memory management unit writes the write-in data into the first physical page address when the other data of the first logical block has been stored in the physical block that the first physical page address belongs to,
wherein D1 is the data dispersion degree of the first logical block, TH1 is the logical block data dispersion degree threshold value, D2 is the data dispersion degree of the physical block that the first physical page address belongs to, and TH2 is the physical block data dispersion degree threshold value.

19. The flash memory controller according to claim 16, wherein when D1=TH1 and D2=TH2, the memory management unit determines whether other data of the first logical block has been stored in the physical block that the first physical page address belongs to,
wherein the memory management unit gets one of the physical blocks of the spare area and writes the write-in data and all of the data belonging to the first logical block in one of the physical blocks stored the data of the first logical block into the gotten physical block when the other data of the first logical block has not been stored in the physical block that the first physical page address belongs to, and
wherein the memory management unit writes the write-in data into the first physical page address when the other data of the first logical block has been stored in the physical block that the first physical page address belongs to,
wherein D1 is the data dispersion degree of the first logical block, TH1 is the logical block data dispersion degree threshold value, D2 is the data dispersion degree of the physical block that the first physical page address belongs to, and TH2 is the physical block data dispersion degree threshold value.

20. The flash memory controller according to claim 16, wherein when D1=TH1 and D2<TH2, the memory management unit determines whether other data of the first logical block has been stored in the physical block that the first physical page address belongs to,
wherein the memory management unit writes the write-in data into the first physical page address when the other data of the first logical block has been stored in the physical block that the first physical page address belongs to,
wherein the memory management unit determines whether empty storage space of the physical block that the first physical page address belongs to is enough to store the write-in data and all of the data belonging to the first logical block in one of the physical blocks stored the data of the first logical block when the other data of the first logical block has not been stored in the physical block that the first physical page address belongs to,
wherein the memory management unit writes the write-in data into the first physical page address and moves all of the data belonging to the first logical block in one of the physical blocks stored the data of the first logical block into the physical block that the first physical page address belongs to when the empty storage space of the physical block that the first physical page address belongs to is enough to store the write-in data and all of the data belonging to the first logical block in one of the physical blocks stored the data of the first logical block,
wherein the memory management unit gets one of the physical blocks of the spare area and writes the write-in data and all of the data belonging to the first logical block in one of the physical blocks stored the data of the first logical block into the gotten physical block when the empty storage space of the physical block that the first physical page address belongs to is not enough to store the write-in data and all of the data belonging to the first logical block in one of the physical blocks stored the data of the first logical block,
wherein D1 is the data dispersion degree of the first logical block, TH1 is the logical block data dispersion degree threshold value, D2 is the data dispersion degree of the physical block that the first physical page address belongs to, and TH2 is the physical block data dispersion degree threshold value.

21. A flash memory storage system, comprising:
a flash memory chip, having a plurality of physical blocks, wherein each of the physical blocks has a plurality of physical page addresses;
a connector, configured to couple to a host system;
a flash memory controller, coupled to the flash memory chip and the connector, and configured to configure a plurality of logical page addresses, group the logical page addresses into a plurality of logical blocks and record a data dispersion degree of each of the logical blocks, wherein the data dispersion degree of the logical block is the number of the physical blocks stored data belonging to the corresponding logical block,
wherein the flash memory controller receives write-in data from the host system, wherein the write-in data is written into a first logical page address, the first logical page address belongs to a first logical block, the first logical page address is one of the logical page addresses, and the first logical block is one of the logical blocks,
wherein the flash memory controller obtains a first physical page address, wherein the first physical page address is one of the physical page addresses, wherein the flash memory controller writes the write-in data into the flash memory chip according to the data dispersion degree of the first logical block and the first physical page address, wherein the data dispersion degree of each of the logical blocks is not larger than a logical block data dispersion degree threshold value.

22. The flash memory storage system according to claim 21, wherein the flash memory controller at least groups the physical blocks into a data area and a spare area.

23. The flash memory storage system according to claim 21, wherein when D1<TH1, the flash memory controller writes the write-in data into the first physical page address, wherein D1 is the data dispersion degree of the first logical block, and TH1 is the logical block data dispersion degree threshold value.

24. The flash memory storage system according to claim 22, wherein when D1=TH1, the flash memory controller determines whether other data of the first logical block has been stored in the physical block that the first physical page address belongs to, wherein the flash memory controller writes the write-in data into the first physical page address when the other data of the first logical block has been stored in the physical block that the first physical page address belongs to, wherein the flash memory controller determines whether empty storage space of the physical block that the first physical page address belongs to is enough to store the write-in data and all of the data belonging to the first logical block in one of the physical blocks stored the data of the first logical block when the data of the first logical block is not stored in the physical block that the first physical page address belongs to, wherein the flash memory controller writes the write-in data into the first physical page address and moves all of the data belonging to the first logical block in one of the physical blocks stored the data of the first logical block into the physical block that the first physical page address belongs to when the empty storage space of the physical block that the first physical page address belongs to is enough to store the write-in data and all of the data belonging to the first logical block in one of the physical blocks stored the data of the first logical block, wherein the flash memory controller gets one of the physical blocks of the spare area and writes the write-in data and all of the data belonging to the first logical block in one of the physical blocks stored the data of the first logical block into the gotten physical block when the empty storage space of the physical block that the first physical page address belongs to is not enough to store the write-in data and all of the data belonging to the first logical block in one of the physical blocks stored the data of the first logical block, wherein D1 is the data dispersion degree of the first logical block, and TH1 is the logical block data dispersion degree threshold value.

25. The flash memory storage system according to claim 22, wherein the flash memory controller records a data dispersion degree of each of the physical blocks, wherein the data dispersion degree of the physical block is the number of the logical blocks that data stored in the corresponding physical block belongs to.

26. The flash memory storage system according to claim 25, wherein the flash memory controller writes the write-in data into the flash memory chip further according to the data dispersion degree of the physical block that the first physical page address belongs to, wherein the data dispersion degree of each of the physical blocks is not larger than a physical block data dispersion degree threshold value.

* * * * *